(12) United States Patent
Su

(10) Patent No.: US 9,230,212 B2
(45) Date of Patent: Jan. 5, 2016

(54) CONTENT BASED RECOMMENDATION SYSTEM

(71) Applicant: Jiawen Su, Mountain View, CA (US)

(72) Inventor: Jiawen Su, Mountain View, CA (US)

(73) Assignee: Peel Technologies, Inc., Mountain View, CA (US)

( * ) Notice: Subject to any disclaimer, the term of this patent is extended or adjusted under 35 U.S.C. 154(b) by 287 days.

(21) Appl. No.: 13/758,886

(22) Filed: Feb. 4, 2013

(65) Prior Publication Data

US 2013/0204825 A1 Aug. 8, 2013

Related U.S. Application Data

(60) Provisional application No. 61/594,287, filed on Feb. 2, 2012.

(51) Int. Cl.
*G06N 5/04* (2006.01)
*G06N 5/02* (2006.01)
*G06N 99/00* (2010.01)

(52) U.S. Cl.
CPC .. *G06N 5/02* (2013.01); *G06N 5/04* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 6,438,579 | B1 * | 8/2002 | Hosken | 709/203 |
| 7,937,725 | B1 * | 5/2011 | Schaffer et al. | 725/46 |
| 2003/0051240 | A1 * | 3/2003 | Schaffer et al. | 725/34 |
| 2008/0052288 | A1 * | 2/2008 | Flinn et al. | 707/6 |
| 2008/0147630 | A1 * | 6/2008 | Chu | 707/5 |
| 2008/0189255 | A1 * | 8/2008 | Zatloukal et al. | 707/3 |
| 2008/0243733 | A1 * | 10/2008 | Black | 706/16 |
| 2008/0244634 | A1 * | 10/2008 | Van Doorn et al. | 725/14 |
| 2008/0250067 | A1 * | 10/2008 | Svendsen | 707/104.1 |
| 2009/0076997 | A1 * | 3/2009 | Ducheneaut et al. | 706/47 |
| 2009/0083258 | A1 * | 3/2009 | Koren et al. | 707/5 |
| 2009/0133059 | A1 * | 5/2009 | Gibbs et al. | 725/34 |
| 2009/0158342 | A1 * | 6/2009 | Mercer et al. | 725/46 |
| 2009/0187467 | A1 * | 7/2009 | Fang et al. | 705/10 |
| 2009/0254971 | A1 * | 10/2009 | Herz et al. | 726/1 |
| 2010/0030764 | A1 * | 2/2010 | Koren | 707/5 |

(Continued)

OTHER PUBLICATIONS

Bell, R.M. et al. "Lessons from the Netflix prize challenge." ACM SIGKDD Explorations Newsletter 9.2 (2007): 75-79. DOI:10.1145/1345448.1345465.*

(Continued)

*Primary Examiner* — Li-Wu Chang
*Assistant Examiner* — Benjamin Buss
(74) *Attorney, Agent, or Firm* — Fenwick & West LLP

(57) ABSTRACT

A media control system enables a device-agnostic and source-agnostic entertainment experience through use of an internet-enabled user device. The user device includes a client application for navigating through media or entertainment content, controlling media devices according to a type of media content selected by the user, and sharing media experiences via social networks. The user device includes smartphones, tablet computers, and other internet-enabled processor-based devices. The media control system leverages the internet access of the user device to enable search and discovery of all available media content. A recommendation engine coupled to the client application learns media preferences from user behavior, generates from numerous disparate media sources recommended media choices corresponding to the media preferences, and presents the recommended media choices on the user device.

20 Claims, 11 Drawing Sheets

(56) References Cited

U.S. PATENT DOCUMENTS

| | | | | |
|---|---|---|---|---|
| 2010/0199218 | A1* | 8/2010 | Farrelly et al. | 715/820 |
| 2010/0268680 | A1* | 10/2010 | Hangartner et al. | 706/46 |
| 2011/0179081 | A1* | 7/2011 | Ovsjanikov et al. | 707/780 |
| 2012/0123992 | A1* | 5/2012 | Randall | 706/50 |
| 2013/0073686 | A1* | 3/2013 | Sandholm | 709/219 |
| 2013/0297611 | A1* | 11/2013 | Moritz et al. | 707/737 |

OTHER PUBLICATIONS

Bell, R. et al. "Modeling relationships at multiple scales to improve accuracy of large recommender systems." Proceedings of the 13th ACM SIGKDD international conference on Knowledge discovery and data mining. ACM, 2007. DOI:10.1145/1281192.1281206.*

Bellotti, V. et al. "Activity-based serendipitous recommendations with the Magitti mobile leisure guide." Proceedings of the SIGCHI Conference on Human Factors in Computing Systems. ACM, 2008.*

Konstas, I. et al. "On social networks and collaborative recommendation." Proceedings of the 32nd international ACM SIGIR conference on Research and development in information retrieval. ACM, 2009.*

Breese, J.S. et al. "Empirical analysis of predictive algorithms for collaborative filtering." Proceedings of the Fourteenth conference on Uncertainty in artificial intelligence. Morgan Kaufmann Publishers Inc., 1998.*

Dell'Amico, M. et al. "Sofia: Social filtering for robust recommendations." Trust Management II. Springer US, 2008. 135-150.*

Middleton, S.E. Capturing knowledge of user preferences with recommender systems. Diss. university of Southampton, 2003.*

Yu, B. "Emergence and evolution of agent-based referral networks." Dissertation. North Caroline State University. (2002).*

Stoilova, L. et al. "GiveALink: mining a semantic network of bookmarks for web search and recommendation." Proceedings of the 3rd international workshop on Link discovery. ACM, 2005.*

Perugini, S. et al. "Recommender systems research: A connection-centric survey." Journal of Intelligent Information Systems 23.2 (2004): 107-143.*

Herlocker, J.L. "Understanding and improving automated collaborative filtering systems." Diss. University of Minnesota, 2000.*

Herlocker, J.L. et al. "Evaluating collaborative filtering recommender systems." ACM Transactions on Information Systems (TOIS) 22.1 (2004): 5-53. DOI:10.1145/963770.963772.*

Bielenberg, K. et al "Groups in social software: Utilizing tagging to integrate individual contexts for social navigation." Diss. Universität Bremen, 2005.*

Van Barneveld, J.J.F. "User Interfaces for Personalized Information Systems." Telematica Instituut (2003): 1-82.*

Das, A. et al. "Google news personalization: scalable online collaborative filtering." Proceedings of the 16th international conference on World Wide Web. ACM, 2007.*

Shani, G. et al. "An MDP-based recommender system." Proceedings of the Eighteenth conference on Uncertainty in artificial intelligence. Morgan Kaufmann Publishers Inc., 2002.*

Hofmann, T. "Latent semantic models for collaborative filtering." ACM Transactions on Information Systems (TOIS) 22.1 (2004): 89-115.*

Geyer-Schulz, A. et al. "Comparing two recommender algorithms with the help of recommendations by peers." WEBKDD 2002-Mining Web Data for Discovering Usage Patterns and Profiles. Springer Berlin Heidelberg, 2003. 137-158.*

* cited by examiner

League

| user-id | league | count | date/time |
|---|---|---|---|
| A | NFL | 1 | t |
| B | NBA | 1 | t' |
| A | NFL | 1 | t'' |
| A | NFL | 1 | t''' |
| ⋮ | ⋮ | ⋮ | ⋮ |

Team

| user-id | league | count | date/time |
|---|---|---|---|
| A | Steelers | 1 | t |
| B | Packers | 1 | t' |
| B | Steelers | 1 | t'' |
| A | Falcons | 1 | t''' |
| A | Saints | 1 | t'''' |
| ⋮ | ⋮ | ⋮ | ⋮ |

Player

| user-id | league | count | date/time |
|---|---|---|---|
| A | Ryan | 1 | t |
| B | Woods | 1 | t' |
| C | Bryant | 1 | t'' |
| ⋮ | ⋮ | ⋮ | ⋮ |

Sport

| user-id | league | count | date/time |
|---|---|---|---|
| A | football | 1 | t |
| B | basketball | 1 | t' |
| A | hockey | 1 | t'' |
| B | football | 1 | t''' |
| B | baseball | 1 | t'''' |

FIG. 6

NFL SEASON CALENDAR

| Weight / Week | August | September | October | November | December | January | February |
|---|---|---|---|---|---|---|---|
| W1 | 1 | 1 | 1.4 | 1.2 | 1.5 | 2.2 | 3 |
| W2 | 1 | 2 | 1.4 | 1.2 | 1.7 | 2.2 | W1 |
| W3 | 1 | 2 | 1.4 | 1.2 | 1.8 | 2.3 | |
| W4 | 1 | 1.5 | 1.4 | 1.2 | 2.0 | 2.5 | |

FIG. 8

CONTENT BASED RECOMMENDATION SYSTEM

CROSS REFERENCE TO RELATED APPLICATIONS

This application claims the benefit of U.S. Provisional Application No. 61/594,287, filed Feb. 2, 2012, which is incorporated by reference herein in its entirety.

TECHNICAL FIELD

The embodiments described herein relate generally to the control of electronic entertainment systems and recommendation of content to users.

BACKGROUND

Consumers have two levels of complexity to deal with in their premises (e.g., homes, offices, etc.). A first complexity deals with managing and controlling various electronic components or equipment in the premises (e.g., audio components, video components, digital video recorders (DVRs), digital video players, etc.). The conventional solution to this problem has been the universal remote that allows a consumer to control more than one component with a single remote.

A second complexity is that the consumer currently has no way to interactively research/browse through the plethora of content choices that are available for them to watch and/or listen to from numerous sources at any particular moment. Consumers of content are faced with the ever increasing dilemma of finding content to watch that matches their desires and needs. Given that most consumers now have access to a plethora of channels, the current approach of using an Electronic Program Guide (EPG) to search for TV content is not a satisfactory approach and most consumers confine their viewing to a limited subset of channels. When content from IPTV and other internet sources are included this approach fails completely. Furthermore, the use of search assumes that the user knows what they are searching for, and works well under that assumption. However, in many, if not most, circumstances the user does not have a specific piece of content that they wish to search for and watch. A conventional search mechanism relies on the user for preference input and does not recommend media and entertainment content beyond those programming options or venues currently known to the user.

BRIEF DESCRIPTION OF THE DRAWINGS

FIG. 6 illustrates examples of bookkeeping tables, under an embodiment.

FIG. 8 is an example of an expert rules table relating to the NFL calendar, under an embodiment.

DETAILED DESCRIPTION

Figure 1:
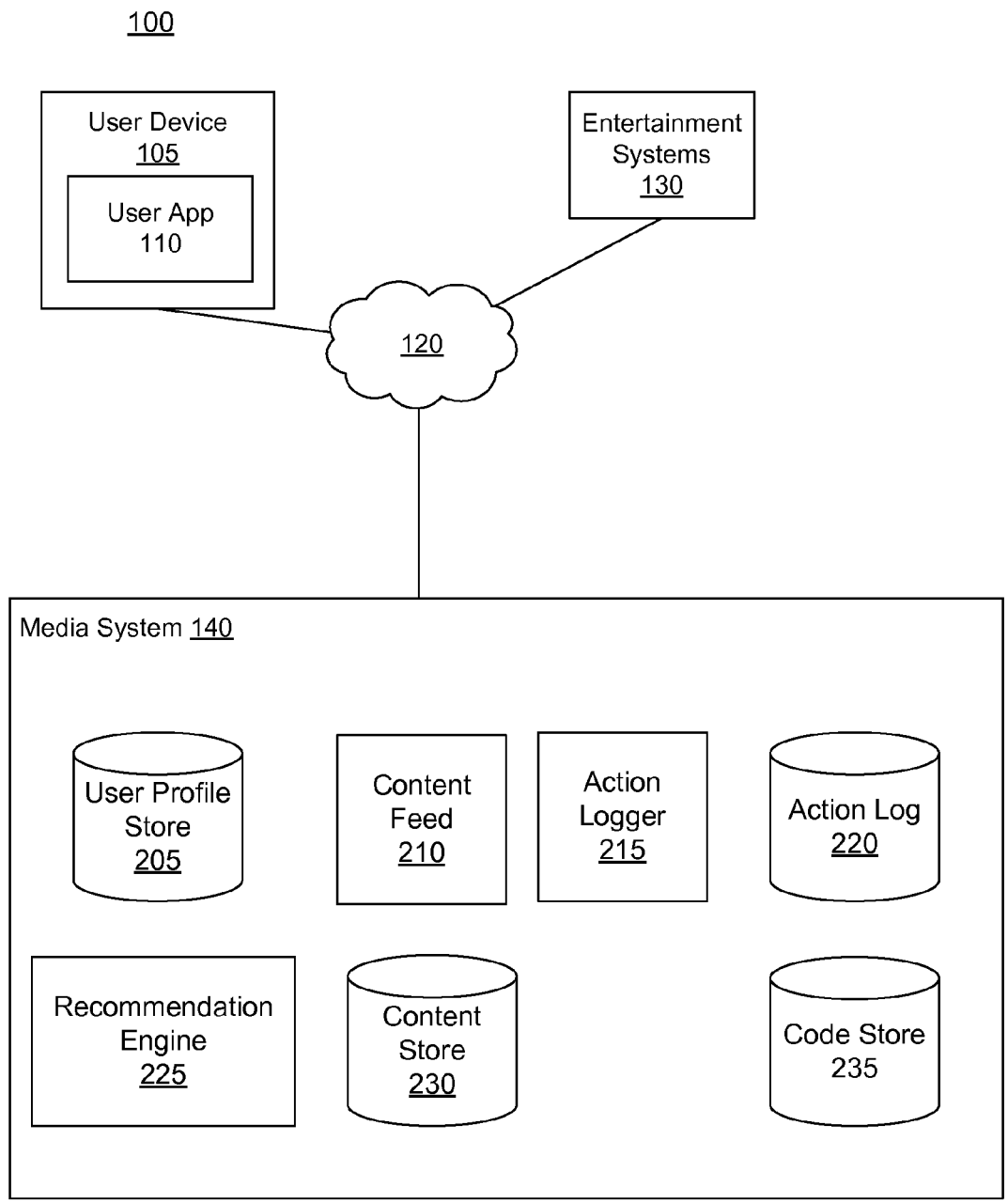
FIG. 1 is a block diagram of an example media control environment, under an embodiment.

FIG. 1 is a block diagram of an example media control environment 100, under an embodiment. The media control environment 100 of an embodiment comprises a user device 105 including a user application 110 that executes on a processor of the user device with which the user interacts, a media system 140 for recommending content for the user, and entertainment systems 130 providing content to the user.

The control environment 100 enables consumers, through the use of an internet-enabled device 105, such as a mobile phone or tablet (herein "user device"), coupled to the media system 140 and user's entertainment systems 130 to navigate through media or entertainment content available to the entertainment systems 130, control entertainment systems 130 to watch and/or listen to media content, and share their media experiences with an internet community or social network.

Entertainment systems 130 can include Digital Video Disk (DVD) players, display devices such as televisions, Audio/Video receivers which switch audio and visual data for playback on speakers and display devices, video game consoles, personal home media computers, Digital Video Recorders (DVRs) and the like. Entertainment systems 130 may be operated through commands (ON/OFF, UP/DOWN/LEFT/RIGHT on a direction pad, channel or volume UP/DOWN, SOURCE, etc.) that are provided on traditional remotes and controllers. Oftentimes a code providing a specific carrier frequency (e.g., radio frequency) and/or authentication (e.g., Infrared) and associated protocol is required to facilitate data transfer with the entertainment systems 130. Some entertainment systems 130 may also receive IP-based based communications and have an associated application programming interface (API) that may be used to receive commands.

Generally, the media system 140 is a system comprising a recommendation engine 225, content feed 210, action logger 215, and associated storage components including a user profile store 205, action log 220, content store 230, and code store 235. The media system 140 aggregates information about media content from a plurality of disparate content sources that are available to the user via premise entertainment systems 130. Based on user interactions with the media content, the media system 140 determines media preferences of the user. In turn, the media system 140 recommends content items that are available for the user on the variety of entertainment systems 130 based on the determined preferences. The media system 140 therefore facilitates and promotes user interaction with a broad range of content. As further described below, the recommendation engine further applies expert knowledge of viewing behaviors in relation to media content in order to improve predictive quality of recommendation/preference scores.

The content feed 210 manages program feed information about content items, but is not so limited. For example, the content feed 210 may retrieve and aggregate information about content items such as TV programs, movies, etc., and their respective sources such as a TV channel, service, etc., in the content store 230. The content store 230 comprises all program information related to premise entertainment systems for users of the media system 140. Given the selection of entertainment systems 130 and associated subscriptions, capabilities, etc., the content store 230 provides a list of content items available to the user and optionally, associated metadata for the items. The recommendation engine 225, in turn, processes the available content items and associated metadata to generate a ranked listing of content for display on the user device 105 via the application 110. The user may select a content item on the user device 105, which causes the user device 105 to facilitate the presentation of the selected content item using the entertainment systems 130.

The action logger 215 monitors user interaction at the user device 105 and with the media and entertainment content provided through the user's entertainments systems 130. The action logger 215 stores information about the user's interactions in the action log 220. The action logger 215 may further store information about the content the user interacted with and related metadata (extracted from user viewing activity).

The recommendation engine 225 of the media system leverages the increasing range and occurrence of interaction events (e.g., user viewing activities) stored in the action log 220 to determine user viewing habits and preferences for producing lists of recommended content items within and/or across the gamut of on demand and/or current broadcast TV, movies and sport categories available on the entertainment systems 130. The recommendation engine 225 may update a profile for the user in the user profile store 205 to indicate the user's preferences. Available content items, in turn, may be ranked based on predicted user preference and provided to the user device 105 (e.g., for display in the application 110).

The media system 140 comprises a code store 235 that may include infrared (IR) codes, optical codes, radio frequency (RF) codes, and codes for other protocols that are used to communicate with entertainment systems 130. The user device 105, or other devices, may use the code store 235 to communicate with the entertainment systems 130. The media system 140 includes a user profile store 205 that stores identification information about the user devices 105 and their users. The user profile store 205 may also include predicted user preferences and associated information determined for the user by the recommendation engine 225.

Thus, the media control environment 100, using a combination of premise hardware (e.g., 105, 130), software module (or components) (e.g., provided to the user device 105, included in the media system 140 and recommendation engine 225, etc.), and/or network 120 connection access, allows consumers to select, control and receive recommendations for media content via their user device 105. The media control environment 100 changes the way consumers select media and how they control that media across their entertainment systems 130 and, as such, enables a device-agnostic and source-agnostic entertainment experience.

As shown, the recommendation engine 225 runs within a media system 140 on a server platform within the general architecture of the media control environment 100 and recommends content to users through the user device 105. The user device 105 of an embodiment include any processor-based device with internet connectivity, a screen, and a means to navigate a user interface displayed on the screen, for example, smartphones, tablet computers, touch-enabled devices (e.g., iOS® devices such as the iPhone®, iPod®, iPad®, etc. and Android® devices such as the Kindle Fire HD®, Samsung Galaxy®, etc.), personal computers (PCs), digital photo frames, and other internet-enabled processor-based client or remote devices. The media system 140 leverages network 120 access (e.g., the internet) of the user device 105 to enable search and discovery of content available for presentation using the entertainments systems 130. The media system 140 (and the recommendation engine 225) further leverages information about user interactions within the media control environment 100 to organize and recommend media content for the user based on user specific priorities/preferences.

The user device 105 may include software or an application 110 that executes on a processor of the user device with which the consumer interacts. When the user manipulates the user device, he or she interacts primarily with the application 110 to control their entertainment experience. The application 110 offers, through content-based navigation, content items as its primary form of interface, where the content items displayed are tailored according to the user's preference by the recommendation engine 225. The content items may be categorized using easy to understand genres that the user can quickly browse through to select content. Under an embodiment, content item categories include TV, movie and sport, but alternative embodiments may include fewer, greater or different categories. The content items are aggregated from a multitude of sources, for example, subscription media, broadcast media, cable, DVR, VOD and internet media to which the consumer has access. In response to user selection of a content item, the user device 105 facilitates the display of the content item by controlling the necessary entertainment systems 130.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claims set forth herein.

The following terms can have the following general meanings as they are used herein, but can also have meanings attributed to them by one skilled in the art.

"Touch-handheld" or "Touch-Enabled Device" is any device that has a touch screen and can be interacted with in a mobile form. For example, iOS® devices such as the iPhone®, iPod®, iPad®, etc. and Android® devices such as the Kindle Fire HD®, Samsung Galaxy®, etc., are touch-handheld devices.

"Content Source" is a source from which a specific piece of content, or content item, is made available (e.g., broadcast, cable, over the air, online, digital video disk (DVD), video on demand (VOD), etc.) to one or more entertainment systems 130.

"IR Code" is an infrared code used to control or perform a specific action on a component or piece of entertainment systems 130 equipment.

"RF" is a radio frequency signal used to wirelessly communicate between the user device 105, network 120 (and any hub or extension on the network), and entertainment systems 130. Examples of RF communications are Institute of Electrical and Electronics Engineers standard IEEE 802.11 (WiFi) and Bluetooth®.

The user device 105, entertainment systems 130, and media system 140 are coupled through a network 120. The network 120 itself may support various communication protocols. For example, the network 120 may provide and facilitate IR, RF, optical, and/or IP-based communication (e.g., over a home network and/or the internet), but is not limited thereto. For example, the network 120 may provide physical data coupling between discrete entertainment system 130 elements (and/or the user device 105) that may communicate using consumer electronics control (CEC) and other protocols.

In some embodiments, the network 120 includes a hub (not shown) that couples the user device 105 to entertainment systems 130 on the user's premises. For example, the hub, when coupled or connected the network 120, is a participating IP-based device in the home network of the user and, as such, can access the Internet. The hub, by virtue of being tethered to the premise network, is available on the premise network to be discovered and coupled to by the user device 105. For example, the hub may publish its IP Address via UPNP packets, and this enables the user device 105 to discover or identify the hub and form a coupling or connection to the hub.

In addition to IP-based communication capability on the network 120, the hub may facilitate IR, optical and RF communication capabilities between the user device 105 and the entertainment systems 130. The hub may also include a number of extension devices (not shown) that overcome line of sight, proximity, or other limitations of communicating with the entertainment systems 130, which may exist in different locations throughout the user's premise. A single hub may manage multiple extensions that are placed around a premise. The hub may communicate with the extension devices through IP-based or RF communications through the network 120. The hub and its extensions can cache IR codes or other data that may be used to control the entertainment systems 130. If the appropriate IR code is not available in the cache, the hub may look up the code (e.g., from code store 235 on media system 140) as the hub may connect to the internet.

In one embodiment, a hub extension is a device that can be placed on a structure (e.g., piece of furniture, shelf, etc.) in the premise in a position from which it has a reasonable line of sight or proximity to components within the entertainment systems 130. The extension receives commands from the hub and translates the commands for control of a given component of the entertainment systems 130 via an appropriate protocol for communication with the component. In one embodiment, the extension receives commands from the hub via RF signals and translates the commands to IR, optical, or RF signals compatible with the given component (or set of components) within range of the extension to be controlled. In addition to emitting control signals, the hub and/or extension may also receive signals to learn/teach codes that are not available as part of the code store 235.

In some embodiments, the user device 105 may include dedicated hardware and/or software to facilitate optical, RF, IR, and/or other communications with the entertainment systems 130, hub, and/or hub extensions. In instances where the user device 105 includes the necessary hardware and software for communicating with each component of the entertainment systems 130, the hub and hub extensions may be omitted from the media control environment 100.

Figure 2:
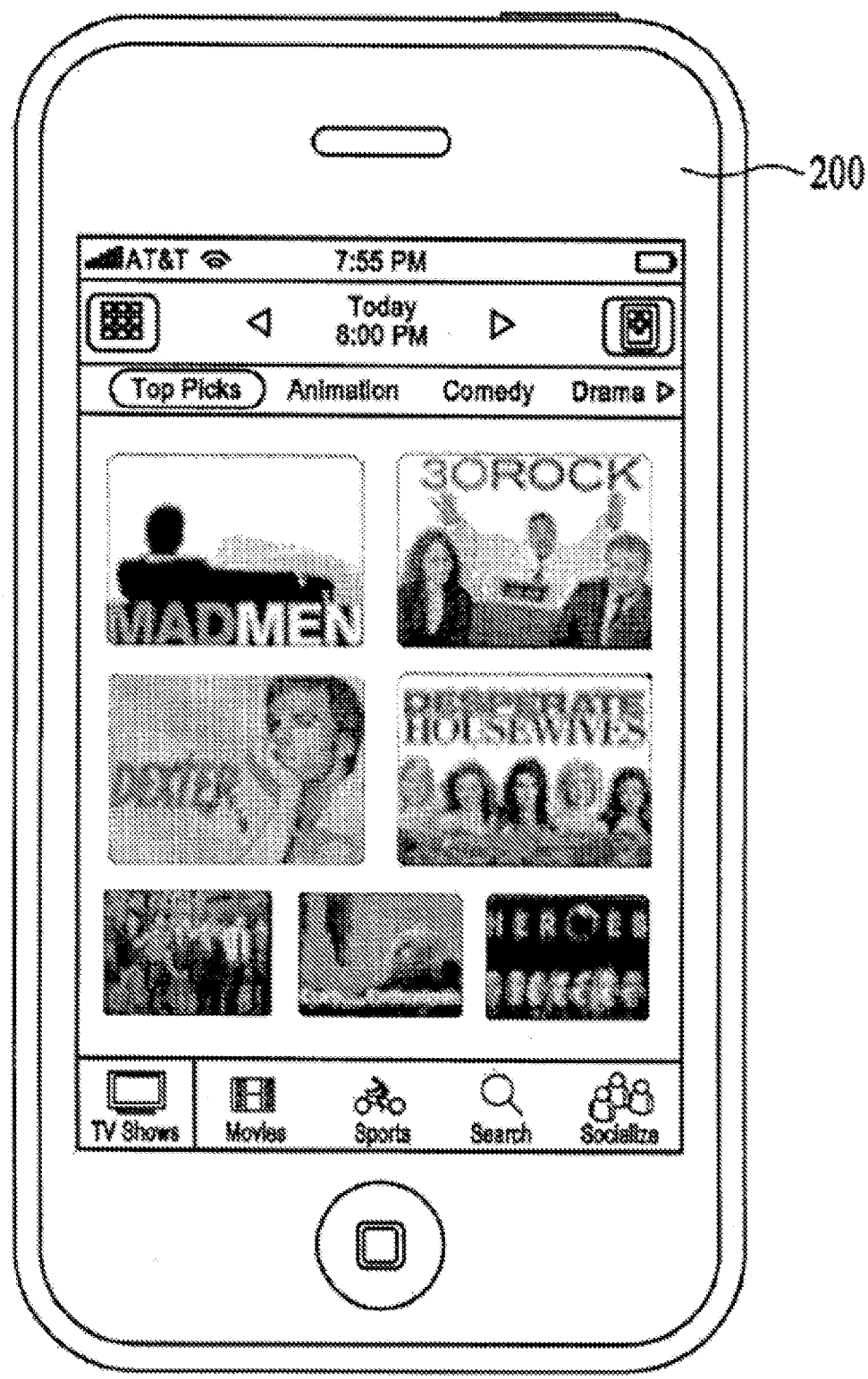
FIG. 2 is a first example screenshot presented on the user device showing content-based navigation, under an embodiment.
Figure 3:
FIG. 3 is a second example screenshot presented on the user device showing content-based navigation, under an embodiment.

FIG. 2 is a first example screenshot 200 showing content-based navigation on a user device 105, under an embodiment. This example screenshot 200 includes "Top Pick" recommendations (in the category of "TV Shows") generated and presented by the recommendation engine via the user device. FIG. 3 is a second example screenshot 300 showing content-based navigation on a user device 105, under an embodiment. This example screenshot 300 includes "Top Pick" recommendations (in the category of "Movies") generated and presented by the recommendation engine via the user device.

In addition to the presentation of "Top Picks" within a particular category as illustrated in FIGS. 2 and 3, the "Top Picks" selection may present an aggregate selection from all available "TV Shows", "Movies" and "Sports". The "Top Picks" category simultaneously presents predicted content preferences across the television, movie and/or sport categories. The recommendation engine generates recommendations for each category and allocates space to "TV Shows", "Movies" and "Sports" within the interface presentation of the user device under the principles of embodiments further described below.

Figure 4:
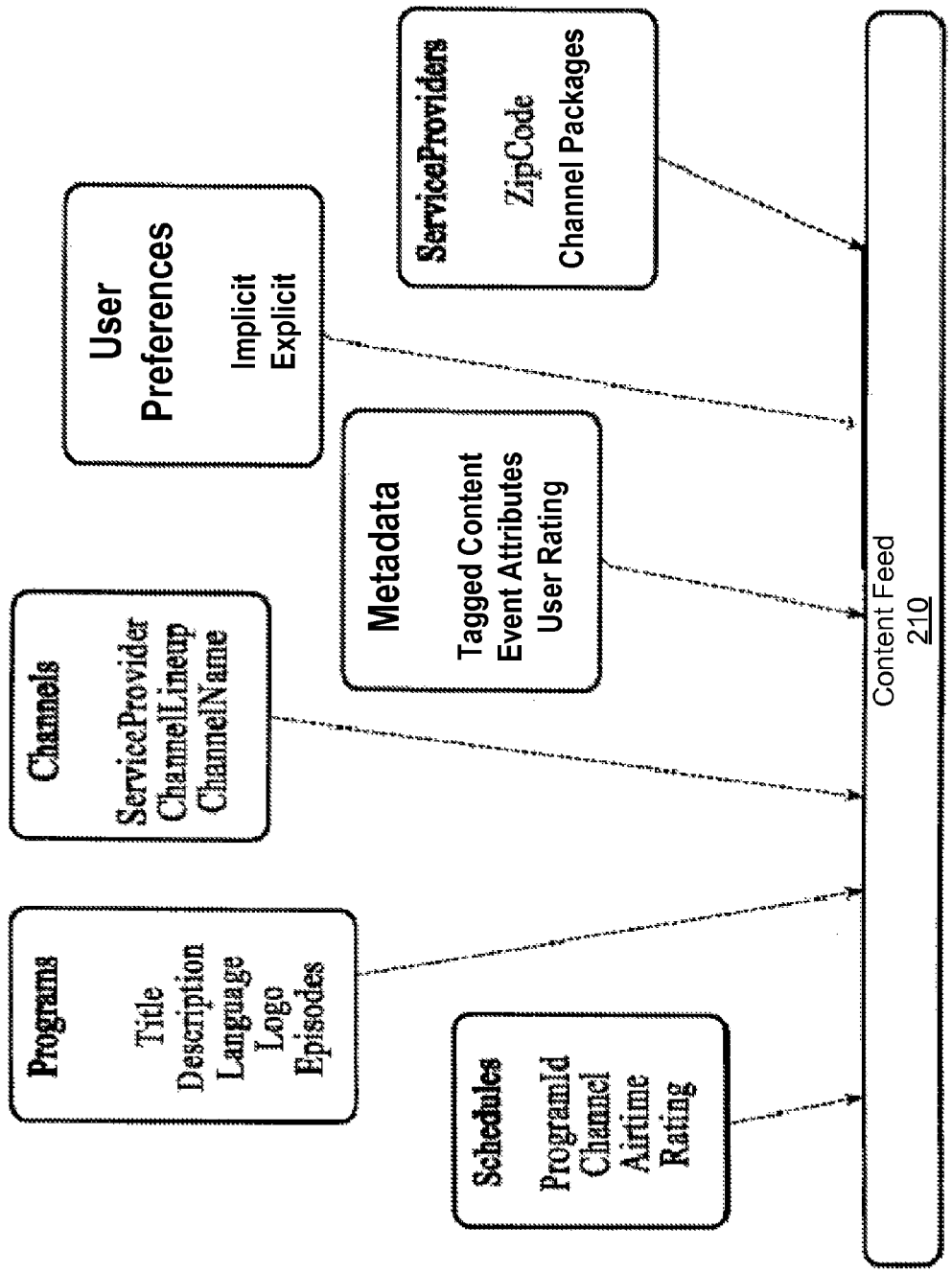
FIG. 4 is a block diagram illustrating example information retrieved by the content feed 210 for generating the content store 230, under an embodiment.

FIG. 4 is a block diagram illustrating example information retrieved by the content feed 210 for generating the content store 230, under an embodiment. The content feed 210 receives a periodic feed of information about content available from users' entertainment systems 130. Thus, the content feed 210 may receive information from TV Guide data providers, users' DVR's, internet media content providers, available TV/movie trailer/promotional data providers, third party content providers including VOD and streaming services, etc.), and aggregates the information about available content in the content store 230. The received information for a given content item may include scheduling, programming, channel, and service provider information. Scheduling information may include a programId, channel, airtime and associated rating. Program information may include an associated program title, description, language, logo, episode number, etc. Channel information may include availability with a given service provider, associated programming, and channel name. Service provider information may include serviced zip codes and channel packages available for the zip codes.

The content feed 210 may additionally store user preference information and other metadata. User preference information may include implicit preferences such as user location and subscribed channel package with a provider. Explicit user preference information may include prohibition of paid content or mature content. Other metadata collected in the feed may include tag information for online content, event attributes such as whether there is associated online content provided with a live event or broadcast show, user ratings for content collected via the media system 140 or a third party, and social media information. The social media information may include a ranked list of tags (e.g., hash tags) and keywords (e.g., from searches or posts) that are trending online.

In one embodiment, the content feed 210 is a universal data loader (e.g., an XML-based data loader) that can load any media metadata from any source based on a data format dictionary for each source. The content feed 210 reformats the received data to a format that may be easily organized and searched in the content store 230. The recommendation engine 225 engine uses the content store 230 to generate tailored content for each consumer as further described below.

The content feed 210 refreshes the content store 230 periodically (e.g., every night, every twelve hours, every hour, etc.) based on the availability of feeds from different sources (e.g., TV Guide data is received from Tribune Media Services, DVR, internet media content, VOD, etc.). The periodic process of refreshing the content database includes the use of crawlers that crawl content media sites (e.g., sites that host media content items such as video, music, images, etc.). The crawlers index content metadata (URLs) from a multitude of media sites, and data resulting from crawling activity is stored at the content database. Because the media system 140 of an embodiment is directed at TV, sport and movie content, the crawler uses the TV Guide data as a basic dataset such that the TV Guide data constrains the crawler to stay within this known or pre-defined realm, but the embodiment is not so limited. The content feed 210 of an embodiment, however, extends to any media from any source. The content database of an embodiment uses content metadata to define event attributes, i.e., metadata "tags" associated with content that describe or identify the various characteristics of such content. The recommendation engine may then track a user's viewing activity using information collected by the action logger 215 and match learned user preferences to content metadata using event attributes as further described below.

Other metadata collected by the content feed 210, including trending keywords and hash tags, may be used to update the content store 210 in real time. Content items associated with the trending keywords and hash tags may be ranked higher during the period of trending before subsiding to a prior level.

As described above, consumers of media content are faced with the ever increasing dilemma of finding interesting content to watch from a variety of entertainment sources 130 that provide broadcast TV, internet TV, satellite TV, DVD, VOD, and other content. As a solution, the media system of an embodiment comprises a recommendation engine 225 to identify content that will be of interest to a specific user irrespective of its source and to provide the recommendations to the user in a personalized way. The provision of such a discovery mechanism has been shown to significantly increase consumer satisfaction and is rapidly becoming an essential tool for any form of content (e.g., retail, news, blogs, TV, movies, music, etc.) where there is significant number of alternatives to chose from.

The recommendation engine 225 is a unique system that generates personalized recommended real-time TV/Movie/Sports programs to an individual user based on a variety of information specific to the user including the user's TV program providers (Cable, Satellite TV, Over-the-air broadcasting, Fiber TV such as AT&T U-Verse and Verizon's FiOS service), user viewing behavior, user ratings of TV programs, metadata such as current trending topics and personal information such as certain demographic data reported during initial client application setup, demographic data reported during operation of the user device by a user and/or demographic data otherwise available for the media system 140 to ingest.

Figure 5:
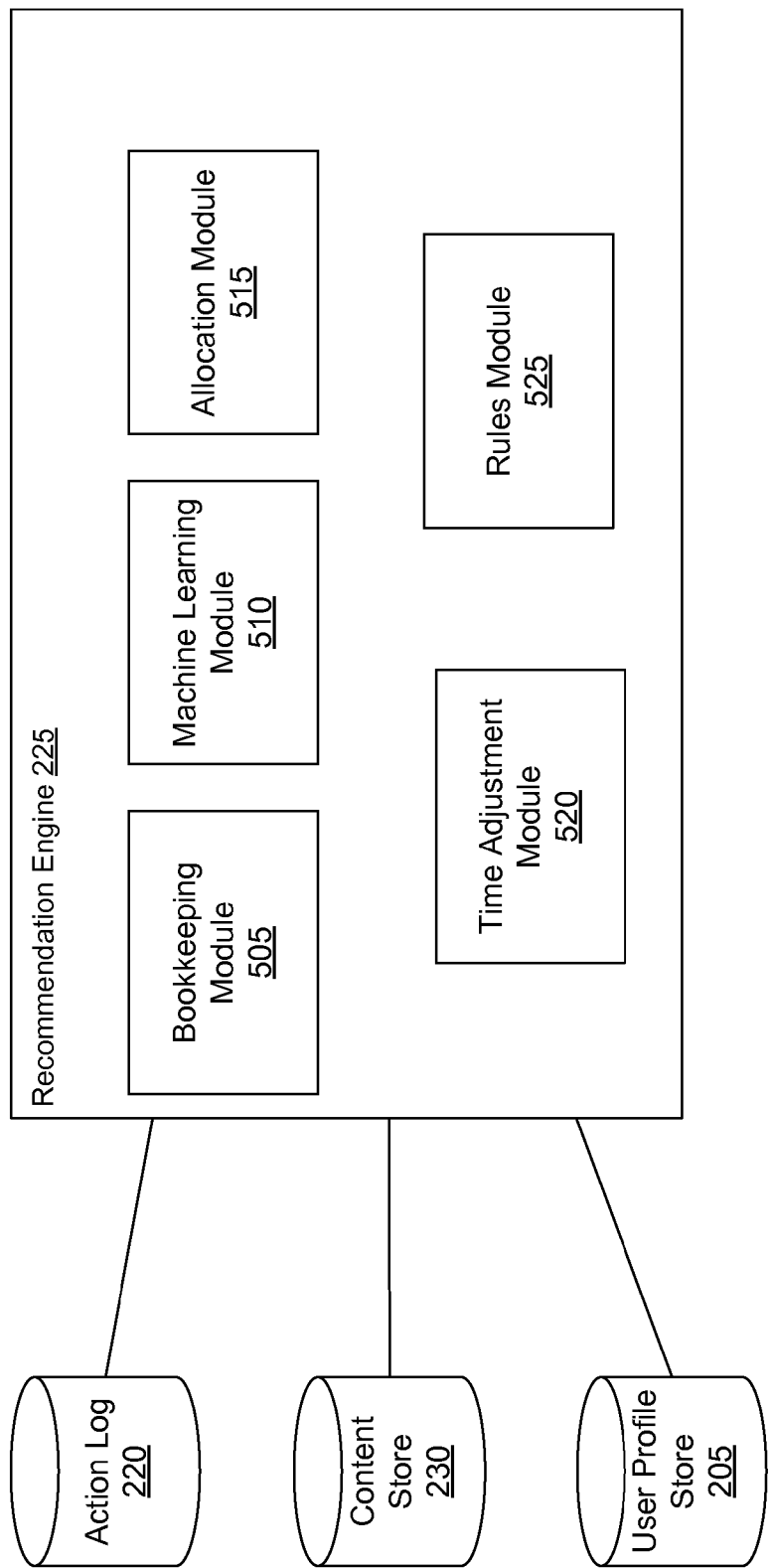
FIG. 5 is an embodiment of an example recommendation engine implemented in the context of a media system, under an embodiment.

FIG. 5 is an embodiment of an example recommendation engine 225 implemented in the context of the media system 140. As set forth in FIG. 5, the recommendation engine 225 may include a number of modules configured to access one or more databases 205, 220, 230 within the media system 140, determine user preferences and generate recommendations.

As described above, the action log 220 stores user history and user media preference information collected by the action logger 215 in response to captured interactions of the user with the user device 105 and entertainment systems 130. For example, as the user engages the application 110 of the user device 105 to select, view and/or search media content, the user device 105 application 110 may forward viewing data of the user to the action logger 215, which further provides viewing activity data and metadata as inputs to the recommendation engine 225.

In one embodiment, the recommendation engine 225 comprises a bookkeeping module 505, a machine learning module 510, an allocation module 515, a time adjustment module 520 and a rules module 525. The recommendation engine 225 modules(s) process the information stored in the databases 205, 220, 230 and produce content recommendations across categories such as sports, television and movies. The recommendation engine 225 under an embodiment processes user activities stored in the action log 220 and their associated metadata to determine user preferences for content that are stored in the user profile store 205. In turn, the recommendation engine 225 recommends available content identified in the content store 230 in each category according to determined user preference scores in the user profile store 205. Under another embodiment, the recommendation engine 225 uses the computed preference scores in the user profile store 205 to generate/present a global list of content items across all such categories presented in a general top picks category. The systems and methods described herein are not limited to generation of recommended content within/across the categories of sports, television and movies and may include a larger or smaller number of content categories.

Under one embodiment, the action logger 215 resolves the information of the user's viewing activity stored in the action log 220 into metadata attributes/categories. The action logger 215 therefore organizes information of a user's viewing activity into attribute categories corresponding to the metadata "tags" or attribute categories in the action log 220 based on the metadata about the consumed media content. Under an alternative embodiment (as described below), the recommendation engine 225 retrieves information about a user's viewing activity from the action log 220 and resolves such information into attribute subcomponents. In one embodiment, the action logger 215 further determines aggregate information for content items viewed based on input from all users of the media control environment 100. The aggregation of user activities in the action log 220 provides overall system user trends and content item viewership data as inputs to the recommendation engine 225. For example, aggregated inputs may include viewing history of users associated with the current user (e.g., those having related interests); viewing history of users that watched same/similar shows as the current user; succeeding viewing history of other users, after they watched a particular show; preceding viewing history of other users, before they watched a particular show; and most watched or trending shows.

The user device 105 forwards to the media system 140 media preferences specified by the user during configuration or during operation of the client application 110. The user profile store 205 maintains such preference data across all users of the media system 140. Media preference inputs in the user profile store 205 may include one or more programming/media subgroups including Language Preference, Time Zone, Media Quality Preference (e.g., Hi Definition Only, Standard Definition Only, etc.), Genre Preference (e.g., Action, Adventure, etc.), Channel Preference (e.g., NBC, ABC, Discovery, etc.), Source Preference (e.g., Online, Live TV, Cable, etc.). The recommendation engine 225 may refine and update the preferences further through processing of the action logs 220. The user device 105 also collects explicit/implicit user feedback of available content and forwards such feedback data to the recommendation engine 225 under principles of embodiments further described below.

The recommendation engine 225 interacts with the content store 230 to retrieve media scheduling data including media currently available to the user given a current time maintained for the user device or a time selected by a user of a user device seeking content available at such time.

Under one embodiment, the recommendation engine 225 recommends content for a user across and within three categories of TV, movie and sport. The recommendation engine 225 recommends content by generating user specific preference scores for content available to the user through the user device 105 at a specified time interval. The bookkeeping module 505, machine learning module 510, and rules module 525 cooperate to provide preference scores for available content. These three components interact to generate TV, Movie and Sport content recommendations by processing discrete and aggregated viewing activity data and applying a mix of human intelligence and machine learning based analysis to the data. A time adjustment module 520 further weights the prediction/preference scores generated by the bookkeeping module 505, a machine learning module 510, and a rules module 525 while an allocation module 515 optimizes a distribution of content among the categories, for example, TV, Movie and Sport categories. Under an embodiment, the time adjustment module 520 may be used to model temporal (short term and long term) patterns in viewer behavior and content/item popularity.

Under an embodiment, the bookkeeping module 505 and the rules module 525 cooperate to generate sporting related content item and sport programming recommendation scores. The bookkeeping module 505 performs a function in direct keeping with its name by literally "booking" viewing events in count intervals. Accordingly, the bookkeeping module 505 comprises a series of "count" tables. When a user selects/views a sporting related content item the recommendation engine 225 identifies/resolves the interaction as a sporting related content item related input and invokes the bookkeeping module 505 to process information of the event. The bookkeeping module 505 monitors/tracks/uses event attributes to maintain "count" tables of sport viewing events, viewing occurrences of the sporting related content items, and time/duration of viewing. As examples of such tables, the bookkeeping module 505 maintains a league table, a team table, a player table and a sport type table.

FIG. 6 sets forth example representations of each such table. The league table includes columns for user id, league, count and time. The team table includes columns for user id, team, count and time. The player table includes columns for user id, player, count and time. The sport table includes columns for user id, league, sport and time. Each row in a table represents a viewing occurrence. For example, the first row of the team table indicates that user A watched a sporting related content item involving the Pittsburgh Steelers at time t. In some embodiments, the bookkeeping module 505 may store additional or difference information. For example, the social networking interest (e.g., trending level) of a particular team throughout the game watched. In other words, was the user interested in the game because others were watching (or going to be watching) it too.

Figure 7:
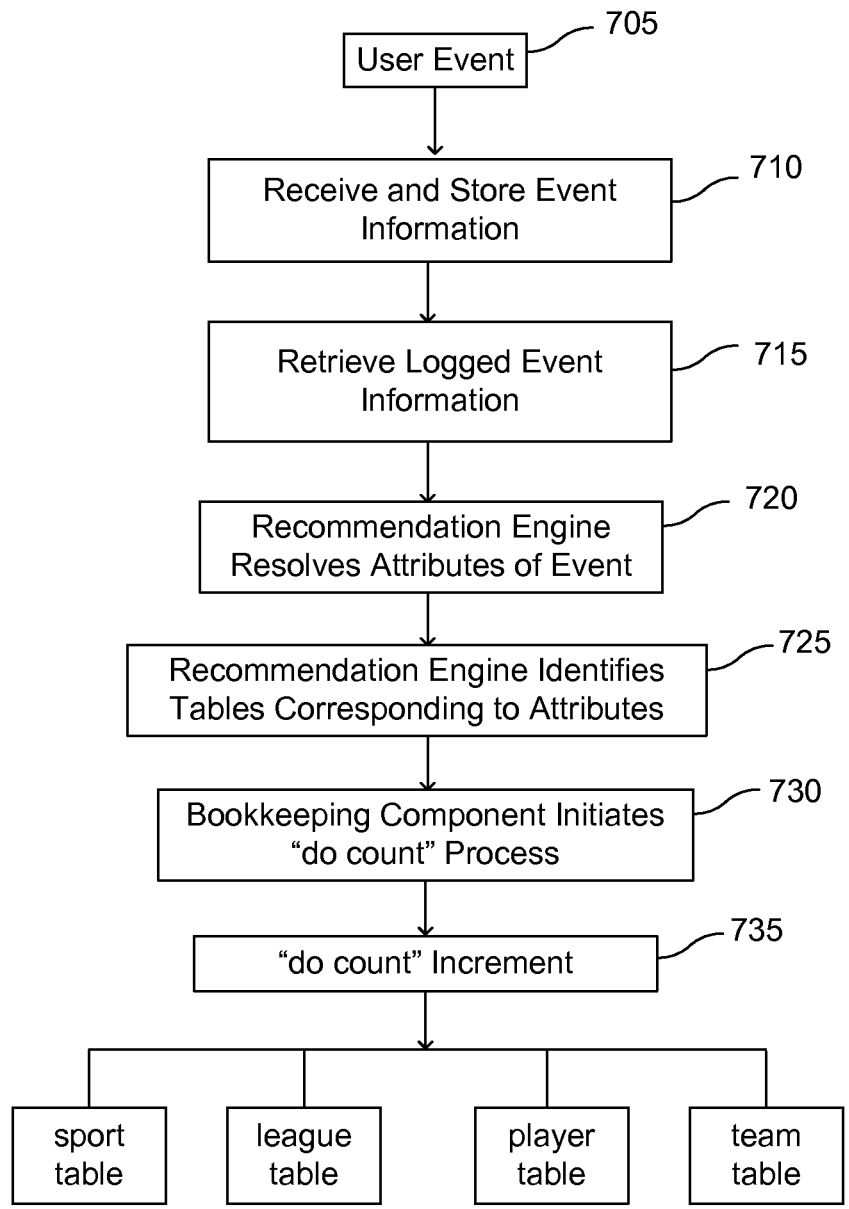
FIG. 7 is a flowchart describing an example operation of a bookkeeping module, under an embodiment.

FIG. 7 is a flowchart describing an example operation of the bookkeeping module 505. A viewer watches a sporting related content item which constitutes a user event 705 or interaction. The action logger 215 receives and stores 710 information about the user event. The recommendation engine 225, in turn, retrieves 715 logged event information for processing.

The recommendation engine 225 resolves/identifies 720 attributes of the viewing event using the information about the user event and information retrieved from the content store 210 about the content item associated with the event. For example, an NFL sports event may have associated attributes including play time, teams playing, whether the event is live or recorded or high definition or not. The content store 210 may include addition information such as whether the event went into overtime, the score (e.g., to distinguish less interesting blowouts from close games), and other associated information. Attributed logged for the user's interaction event may include at what point the user accessed the content item during the event, what content item the user was viewing previously, and how long the user viewed the content item.

The recommendation engine 225 identifies 725 bookkeeping tables corresponding to attributes of the viewing event. The bookkeeping module 505 then initiates 730 a "do count" process. The "do count" process accounts for the viewing event of the user by recording (incrementing) count values 735 in tables (e.g. in a sport type table, a league table, player table and a team table). The recorded values maintained in such tables track viewing occurrences corresponding to attributes of the event, e.g. the "league" table records one (1) count for an event with an "NFL" attribute (e.g. NFL game, pre-game show, etc). Multiple viewing occurrences may correspond to a user's selected viewing of a single sporting related content item. For example, when a user watches an NFL game, the user views an NFL event, two competing NFL teams, a football sporting related content item and competing players. Each of the aforementioned viewing attributes of the single viewing event represent viewing occurrences that are tracked by the bookkeeping module 505 as further described below.

The bookkeeping module 505 of an embodiment receives viewing activity information of a user as an input. Based upon attributes of a user's viewing activity, the bookkeeping module 505 uses a relational database to maintain "counts" of viewing events/occurrences in tables. For example, the count entry for a particular NFL team may be increased every time the user watches the team's game. A row in a table represents a viewing occurrence for a particular user. As one example, the first row of the league table includes values for user id, league, count and time. The user id "A" uniquely identifies a particular user. Under an embodiment, various methods including combinations of strings and integers may be used to identify users. The value "NFL" in the league column of the first row indicates the user's selection of an NFL related event for viewing. The value of "1" in the first row of the count column indicates a count increment of 1 corresponding to the user's selection of the NFL viewing event. The time t represents the time the user selected NFL related content for viewing. The NFL related viewing event may be an NFL game but is not so limited. Under an embodiment, an NFL related viewing event includes NFL media events such as pre- and post-game shows, sport analysis programming, NFL films, NFL draft, NFL sponsored programming, etc.

Under an embodiment, as the bookkeeping module 505 receives viewing attributes, the bookkeeping module 505 maintains "counts" of viewing events. Such viewing attributes come from program metadata associated with the content item viewed by the user and, optionally, information about the user's interaction with the content item. The team table maintains a count of a user's selection/viewing of sporting related content items involving certain teams. The teams table includes members of leagues but is not so limited. As one example, teams include the various teams of the NFL or the NBA. The player table maintains a count of a user's selection/viewing of sporting related content items involving certain players. The player table maintains counts for highly recognized players such as Tiger Woods or Kobe Bryant. However, the player count functionality of the system is not limited to high profile players and may be expanded to cover every player in a league such as the NFL as just one example. The sport table maintains a count of a user's selection/viewing of sport types. The sport table maintains information for a broad range a sports including football, hockey, basketball, baseball, golf, tennis, etc. The sport table may under an embodiment include any number of sports to represent the viewing activity of media control system users.

The recommendation engine 225 is not limited to the tables described above. Further, the recommendation engine 225 including the bookkeeping module 505 may combine the information of the four tables in FIG. 6 into fewer sets of tables or conversely use a greater number of tables as needed to capture the same or additional information. The organization of data in FIG. 6 is in no way meant to limit the recommendation engine 225 and methods described herein. Under an embodiment, the recommendation engine 225 may use any number of tables to capture data under principles of a relational database data storage and management system. The recommendation engine 225 is not limited to the use of a relational database and may use other database systems to implement the systems and methods contained herein.

As already noted above, a single viewing event may cause count increments across multiple tables. As one example, a user "Smith" may decide to view an NFL matchup between the Houston Texans and the New Orleans Saints. The single viewing event generates a row in the league table which respectively records values of Smith, NFL and one (1) in the user id, league and count columns of the league table. However, this viewing event also generates a row in the sport type table which respectively records values of Smith, football and one (1) in the user id, sport and count columns. Further, this viewing event generates two rows in the team table. A first row records the values of Smith, Texans and one (1) in the corresponding user id, team and count columns. A second row records the values of Smith, Saints and one (1) in the corresponding user id, team and count columns. Furthermore, the player table of an embodiment may include a table that tracks selection/viewing of content including Matt Ryan. Accordingly a user's viewing of the Falcons-Saints matchup triggers an entry in the player table with values of Smith, Ryan and one (1) in the corresponding user id, player and count columns. All entries described above include a corresponding time column in order to "time stamp" the user's selection of an event. The bookkeeping module 505 maintains counts in the tables described above in a profile stored in the user profile store 210 coupled to the recommendation engine 225. The user profile represents the viewing behavior of a user captured as a collection of discrete viewing occurrences.

The bookkeeping module 505 uses the viewing event tables to monitor and learn a user's sporting related content item preferences. As one example, a user may have viewed five (5) NFL events, two (2) NBA events and one (1) MLB event. The bookkeeping module 505 may score a user's NFL preference by dividing the NFL count by the total number of counts recorded across all league values monitored by league table. The bookkeeping module 505 may weight each count according to the time of the viewing event. The bookkeeping module 505 may use a weight $ke^{-t}$ where k is some constant (which may be one) and where the t represents the time of the viewing event. Accordingly, the weight devalues an event in the distant past eventually reducing such contribution to near zero. Therefore, the NFL count of five (5) described above may generate a very small preference score if all such events are long in the past. It is noted that simple counts are used in the tables set forth in FIG. 6 but the systems and methods herein are not so limited. Further, the recommendation engine 225 may incorporate the effect of time using weighting schemes other than the exponential weighting scheme described above.

The bookkeeping module 505 is well suited to the particular dynamics of sport viewership. For example, many viewers are interested in only a handful of sports and a handful of teams and/or players and generally watch their "home" team more often than other teams. The term "home" team indicates a team in some way associated with a person's background or experience. A "home" team may play in a particular city or state of a person's childhood residence. Or a "home" team may be inherited through family tradition. A user may acquire a "home" team interest by attending a particular university and thereafter supporting alma mater related sporting related content items. A user may develop a "home" team interest through family relationships, e.g. spouse cheers for a particular team, a relative plays for a particular team, etc. The bookkeeping module 505 is capable of monitoring a user's day to day viewing activities and empirically discovering "home" teams based on demonstrated preferences and then narrowing recommended content to account for a home team effect. Under alternative embodiments, the recommendation engine 225 may receive demographic data from the user (submitted through user device setup and/or during operation) either directly or through the action logger 215. Under an embodiment, a bookkeeping module 505 maintains demographic data tables that provide the recommendation engine 225 the ability to link sporting related content items attributes or metadata with user specific demographic data. The bookkeeping module 505 may then use the demographic data to improve the bookkeeping module 505's ability to identify a home team effect.

The bookkeeping module 505 fails to account for a broader range of sport viewing attributes that attract viewers beyond demonstrated preferences and/or "home" team effect. A rules module 525 of the recommendation engine 225 captures sporting related content item and/or general cultural phenomena that drive interest in sporting content beyond what may be explained by demonstrated viewing activity. For example, seasonal attributes of particular sport content may independently contribute to viewer interest as much as demonstrated user preferences and may even contradict or override preference data. For example, a viewer known to be a "die hard" Steelers fan is very likely to watch an NFL playoff game irrespective of the participating teams, i.e. even when the Pittsburgh Steelers have been eliminated from post-season play. Additionally, if the Steelers' playoff chances depend on the outcome of a particular game or a particular game features a potential opponent of the Steelers in the playoffs (or late in the season), the Steelers fan is likely to want to watch those games over others. For example, for a new sports event/program, the recommendation engine 225 will fetch team attribute info from program meta data, then it will lookup the user profile information in the bookkeeping table to see whether the user has watched many of the team's programs in the past. A higher recommendation score will be assigned if count of the team from past watch programs is high. The recommendation score may further be weighted based on how recent the user watched the team. Additionally, a casual sporting content viewer (with moderate football viewing activity manifest in the bookkeeping module 505 tables) is much more likely to watch an NFL playoff game than a regular season NFL game and is almost guaranteed to watch at least a portion of the super bowl. And even a viewer with zero demonstrated sport viewing activity is more likely to watch a football game over competing content when that game happens to be the super bowl. The same information may also be determined from social network or other data sources. For example, if the user has shown interests in particular team or sports (e.g. by liking, tagging, mentioning, or otherwise indicating interest in the team or associated player), the system will give higher recommendation score for the team events.

Expert rules supplement empirical viewing data with "real world" experience. Under an embodiment, expert rules are based on human knowledge, experience and intelligence. The rules module 525 of the system comprises a bank of such knowledge based rules. In particular, the rules module 525 has built-in knowledge of viewer interests and viewing activity patterns in relation to major sporting related content items and seasonal (calendar driven) sport phenomenon. As one example, the NFL season starts in September and finishes in February. Using a rules-based system, the recommendation engine 225 knows in general that NFL games in January are more interesting than those in December, and December's games more interesting than those played in November. A similar knowledge based rule exists for the NBA, NHL, MLB, College basketball (including the so-called March-Madness schedule) and College football. Additional expert knowledge rules include an awareness of important sports events such as SuperBowl and Tennis/Golf grand slam events and sport specific play-off rules.

The knowledge based rules component of the recommendation engine 225 captures these known iterated behavioral patterns including calendar, regional and event driven patterns. As indicated above, interest in the NFL varies greatly by month of the year. The preseason games of August generate little interest. The NFL begins its regular season in September and kicks into "high gear" in December, January and February. Interest increases accordingly during these latter months. The NBA traditionally features a great number of early season low interest games. However, the NBA generates an increasing level of interest from February through June. Regional patterns provide further insight into viewing behaviors. For example, a Midwestern population may feature greater interest in traditional American sports such as football, baseball and NASCAR racing. Some sports manifest event centered calendars. For example, interest in Golf spikes for each of the four major tournaments (the PGA Championship, Masters Tournament, British Open and US Open Championship). Similar interest arises for the Ryder Cup Matches held every two years. As another example of an event driven sport, tennis features four major grand slams a year (the Australian Open, the French Open, Wimbledon, and the US Open). Each grand slam event drives attention among viewers that otherwise may view little if any tennis otherwise. The recommendation engine 225 uses a rules module 525 to incorporate an awareness of viewing behaviors relating to calendar, regional and event driven interests/patterns In addition, data integration with team's standing in the league will drive interest level. Take the example of NFL, later season games among play-off spot contenders will have a lot higher interests. Same for traditional "nemesis" teams (e.g. Pittsburgh Steelers v.s. Baltimore Ravens). The recommendation engine 225 may identify these high profile and rivalry games based on prior viewership of a particular matchup or time in which the game is played against an average. Additionally, the recommendation engine's 225 crawlers may identify common keywords associated with matchups between teams or players other than the team name or player names. For example, the yearly game between the Oregon Ducks and Oregon Beavers is commonly known as "the Civil War" and both teams are frequently mentioned in association with the colloquial identification. Accordingly, the recommendation engine 225 may identify these colloquialisms and associated teams (which may change every year in the case of college "Bowl Games" where matchups are determined anew each year based on ranking). Tending mentions of a particular player in social network or identification of new articles may drive interest in the team game as well, such as the "Linsanity" phenomena in season 2012 in NBA.

Under a preferred embodiment, the recommendation engine 225 uses a combination of a first preference score from the bookkeeping module 505 and a second preference score from the rules module 525. Under an embodiment, the second score is actually a weighting adjustment applied to the first score. In other words, the rules module 525 supplies additional weighting information to adjust the preference score generated by the bookkeeping module 505. This additional weighting captures known iterated viewing behaviors. For example, FIG. 8 is an example of an expert rules table capturing seasonal interest in the NFL. The NFL table organizes the NFL season into months and further tracks interest by week. Each Month-Week combination featuring an NFL event (preseason, regular season or post-season game) is associated with a weighting score. A weighting score of one (1) indicates a completely neutral adjustment. For example, a bookkeeping preference score multiplied by a weighting score of one (1) would return the same recommendation score. Weighting scores less than or greater than one reduce or increase the bookkeeping preference score accordingly. The weighting scores are assigned through human intelligence and awareness of the determined sport viewership phenomenon described above. For example, the August-Week 2 combination receives almost no positive weighting due to the fact that August features pre-season games. Even known NFL fans dislike pre-season matchups and casual football fans have almost no inclination to select pre-season games. The last three weeks of September receive increased weighting scores. Note that the September-Week 1, September-Week 2, September-Week 3 and September-Week 4 combinations receive higher ratings than all of the October weeks. This adjustment scheme under one embodiment describes an initial burst of interest in the first few weeks of the NFL season due to preliminary enrollments in fantasy football leagues. However, fantasy football driven viewership interest fades over the first few weeks of the season potentially fading into a secondary interest in statistics collected/viewed in offline venues. In addition to overall knowledge of fantasy player statistics, API integration with fantasy sports service providers may pull teams and players having the most fantasy interests for users of the media system 140 and recommend content items where those teams or players are producing points for the user. As seen in FIG. 8, weighting scores then steadily increase throughout November, December and January. Higher scores for January-Week 1, January-Week 2, January-Week 3, and January-Week 4 reflect increased interest in the playoffs. Of course, February-Week 1 receives the highest score on the entire calendar to capture the national sporting/cultural phenomenon of the Super Bowl. In addition, the weights may be determined based on rivalry, playoff, fantasy and other information determined about user and general audience interests as described above.

Figure 9:
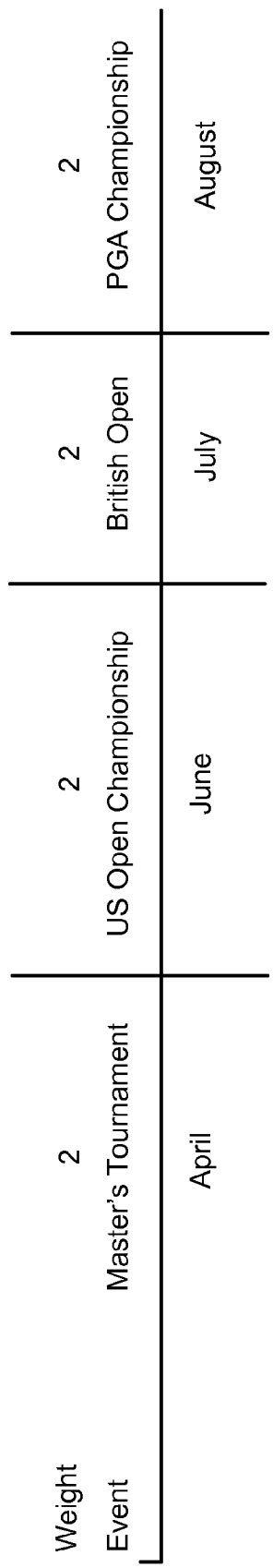
FIG. 9 is an example of an expert rules table relating to PGA major events, under an embodiment.

FIG. 9 is an example of an expert rule table comprising weights for the four premiere golf events—the PGA Championship, Masters Tournament, British Open and US Open Championship. Each major event carries a weighting score of 2 but an embodiment is not so limited. This consistent score for each event reflects an approximate doubling of interest in golf for a major event irrespective of which major event. A casual observer of golf may register an extremely low user profile count for golf related content. Despite a low recommendation score for golf across all sport types, the recommendation engine 225 may still recommend a major event for viewing due the weighting factor of 2 for such event which effectively doubles the preference score for the particular major. The weighting factor for major events may be increased to a number sufficient to guarantee recommendation of each major event for viewing under an embodiment. Under another embodiment, the golf majors expert rules table may increasingly weight successive rounds of each such event thereby boosting preference scores for later (or final) rounds in majors events.

The recommendation engine 225 combines operation of the bookkeeping and expert rules table to generate sporting related content item recommendations. As already set forth above, a single viewing event may cause count increments across multiple tables within the bookkeeping module 505. The recommendation engine 225 must account for this same phenomenon when generating a sporting related content item recommendation. For example, a user may request content item recommendations from the recommendation engine 225 by merely activating the user application 110. The recommendation engine 225 must then analyze sporting related content items currently available for consumption in a time slot of interest to the viewer. This time slot may simply be the half hour time slot surrounding the time that the user activates the user device client application or may represent a specific time slot (in the future) selected by the user. Assume for illustrative purposes that five sporting content items are available at a given selected time slot. For each content item, the recommendation engine 225 resolves/identifies attributes of user events associated with the content items from information collected by the action logger 215 and information retrieved from the content store 210. Information from the action logger 215 may include both individual user event information and across the population of users participating in the media system 140. Consider, for example, an event featuring a New Orleans Saints v. Atlanta Falcons matchup. The recommendation engine 225 identifies all bookkeeping tables corresponding to attributes such as team, sport, players, etc. The recommendation engine 225 then retrieves user specific data maintained in identified tables and stored in the user profile 205 database by the bookkeeping module 505. In addition, the recommendation engine 225 may retrieve population (general interest) data based on the tables, such as the percent of all users watching the matchup, those who often watch football watching the matchup, etc. In addition, the recommendation engine 225 may determine the percentage of other users—that are similar to the user (or users overall)—watching or planning to watch the matchup (or having watched a previous matchup featuring one or both of the teams).

Under an embodiment, the bookkeeping module 505 generates a score for the particular event. The bookkeeping module 505 may generate a score with respect to each applicable bookkeeping table and then average all such scores to produce a final bookkeeping score. A simple average across bookkeeping scores may be used but the systems and methods disclosed herein are not so limited. The recommendation engine 225 weights the bookkeeping score using weights from the rules tables. In the case of more than one applicable weight, the recommendation engine 225 averages the weights under one embodiment.

Figure 10:
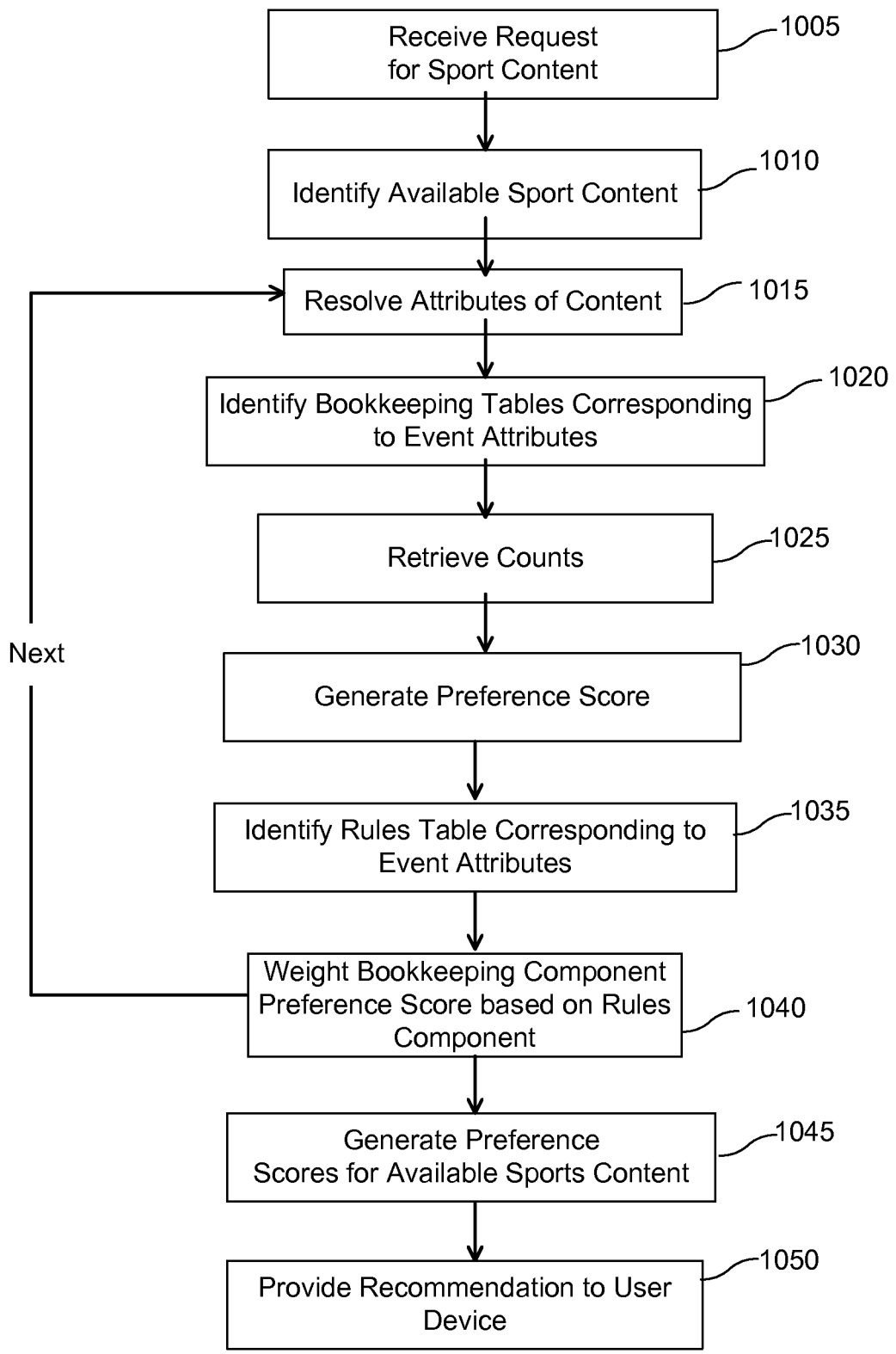
FIG. 10 is a flowchart describing an example operation of bookkeeping module and rules module in generating preferences scores for sport content, under an embodiment.

FIG. 10 is a flowchart representing an example operation of the recommendation engine 225 in recommending a sporting related content item for user consumption using a combination of the bookkeeping module 505 and the rules module 525. The recommendation engine 225 receives 1005 a recommendation request in a sport category from the user device. The recommendation engine 225 identifies/retrieves 1010 sporting related content items available to the recommendation engine 225 (e.g., those on or starting within the hour). Using information of a content item (selected from the available content items), the recommendation engine 225 identifies/resolves 1015 attributes of the sporting related content item using information and metadata retrieved from the content store 210.

The recommendation engine 225 identifies 1020 bookkeeping tables corresponding to such attributes and identified 1035 all expert rules tables (i.e., weights) corresponding to such attributes. The recommendation engine 225 retrieves 1025 user attribute counts (viewing occurrences) relating to the content item attributes from tables maintained by bookkeeping module 505 in the user profile. The bookkeeping module 505 generates a preference score for the content item based on the attribute counts. For example, the bookkeeping module 505 may aggregate count data across bookkeeping tables to determine the user's preference for the content item based on viewing history.

The rules module 525 then uses the attributes of the sporting related content item in the identified 1035 rules tables to determine any weights applicable to the event. The rules module 525 then applies 1040 any identified weights to the bookkeeping score to produce a weighted preference score. The recommendation engine 225 repeats this process (e.g., steps 1015-1040) for the sports related content items available at the particular time slot to generate 1045 the preference scores for the available sports content items.

The recommendation engine 225 then provides 1050 recommended content items to the user device. Under an embodiment, the recommendation engine 225 is configured to recommend the top N programming options by preference score. To illustrate, the recommendation engine 225 could select the top N programs with the highest recommendation ratings where N represents the number of content selections the user device is configured to display in the sport category.

A machine learning module 510 of the recommendation engine 225 (described in greater detail below) assumes responsibility under an embodiment for monitoring user content item consumption and for recommending content items. However, the rules module 525 may also be used under an embodiment to adjust machine learning generated preference scores. The recommendation engine 225 machine learning module 510 may generate very low user preference scores for award show content but nevertheless recommend the Academy Awards show due to a rules adjustment to the preference score generated by the machine learning module 510. The weighting factor (as maintained in appropriate expert rules tables) for certain TV and movie events may be increased to a number sufficient to guarantee recommendation of each such major TV or movie event for viewing under an embodiment. As further examples, rules may boost preference scores for season premiere and season final televisions shows and brand new televisions series. Rules may also downgrade preference scores for re-runs, shopping programs and paid vendor programs. Under an embodiment, expert rules may be based on specified user preferences, e.g. sports preferences and media preferences. Based on these preferences, rules may for example block all soccer programming for a user who specifies that he or she never watches the sport or boost preference scores for animation programming for a user who specified interest in the genre.

As indicated above, a machine learning module 510 of the recommendation engine 225 (described in greater detail below) assumes responsibility under an embodiment for monitoring user content item viewing activity and for recommending content items. The collaborative filtering techniques of the present disclosure are generally described in the example context of a recommendation engine 225 that utilizes the collaborative filtering techniques disclosed herein to recommend identified content items such as movie and television programming content to the user. However, the disclosed collaborative filtering techniques are by no means limited to this example context, and instead can be used in recommender systems for any of a variety of items in any of a variety of contexts, such as for generating recommendations for any of a variety of products or services, including books, movies, movie rentals, music, news articles, recipes, and the like. To illustrate, these collaborative filtering techniques can be implemented in conjunction with a bookseller's website for recommending books to a user or in conjunction with a movie-renter's website for recommending movie rentals to a user.

The mathematical equations, mathematical definitions, mathematical expressions and other mathematical relationships described herein are identified as "EQ. #" (whereby "#" is the associated identifying number) for ease of identification.

The content store 210 maintains information about content items available for viewing at the user premises. The user profile store 205 and action log 220 contain data representative of preference information, including data representative of users' profiles, data representative of users' explicit and implicit preference feedback, data representative of the relationships between items or representative of the similarities of items, data representative of the characteristics of items, and the like.

The recommendation engine 225 is configured to identify content items available to a user on their premises and provide a list of content items through the recommendation engine 225 to the users' device 105. The user device 105 is configured to facilitate the implementation of one or more graphical user interfaces such as with the user application 110, that provide a content based navigation interface as described in FIGS. 2-3. In response to selection of a displayed content item, the user application 110 causes the user device 105 to issue commands for controlling the various entertainment systems 130, as necessary, at the user's premise to display the selected content. Under at least one embodiment, the recommendation engine 225 implements a machine learning module 510 (e.g., software executed by one or more processors) to identify recommended content items for the user using the collaborative filtering techniques described herein.

A user of a user device 105 may indicate preference through a rating system presented through the GUI. The preference feedback obtained via the GUI can include explicit preference information, implicit preference information, or a combination thereof. To illustrate, the GUI can include a user profile screen whereby the user can provide explicit feedback that potentially pertains to the user's general profile in the profile store 205, such as the user's gender, the user's age, the user's geographical location (e.g., zip code, city, state, country, etc.), and the user's viewing preferences, such as preferred content categories (e.g., comedy, drama, action, family, etc.). The GUI also can obtain explicit item-specific preferences from the user, such as via a rating screen that lists recently viewed multimedia programs and provides the user an opportunity to provide explicit preference feedback with respect to each listed multimedia program (e.g., through a user-selectable "star" rating, a "thumbs-up, thumbs-down" rating, etc.). The GUI also can obtain implicit preference information by monitoring the user's activities or based on provided information. This implicit preference feedback can include, for example, the types of multimedia programs selected by the user for viewing, the frequency in which the user views a particular type of multimedia program, the average length of time that the user views a multimedia program before switching to another multimedia program, the entertainment systems 130 used to present different content items, and the like.

The user device 105 may provide the user an opportunity to rank content, i.e. to provide explicit feedback through a "thumbs up/thumbs down" or "1-5 stars" rating system. The user also provides implicit feedback by merely selecting and consuming content. As the viewer selects/views media events, the user device 105 forwards viewing and preference data to the action logger 215 and/or the recommendation engine 225. The machine learning module 510 of the recommendation engine 225 monitors preference data and forwards preference feedback to the content store 210 which then stores such feedback data. The machine learning module 510 uses this preference feedback data to identify/recommend content to the user based on collaborative techniques described herein. The recommendation engine 225 then provides the recommended programs and viewing options to the user via, for example, the GUI of the user device.

Figure 11:
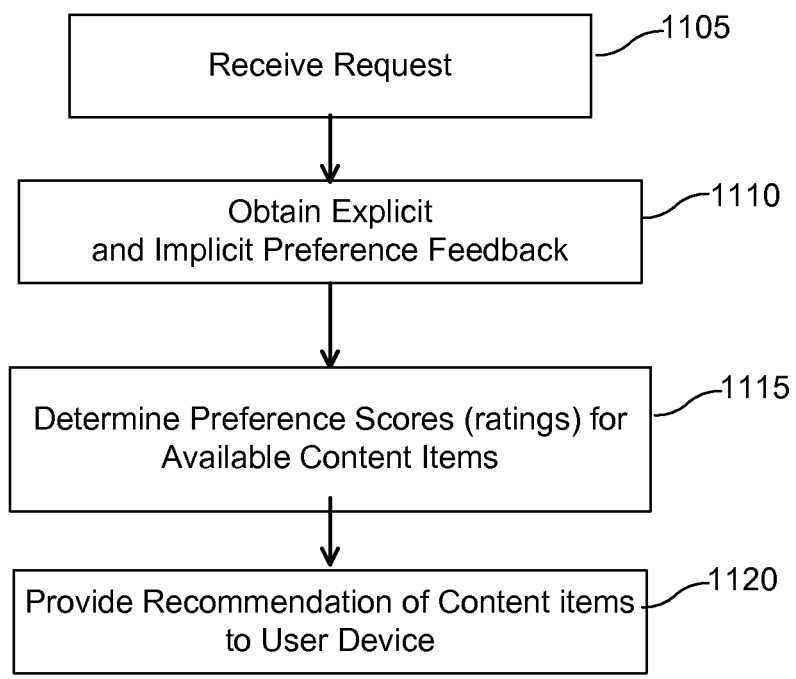
FIG. 11 is a flowchart describing an example operation of machine learning module in generating preferences scores content items, under an embodiment.

FIG. 11 is a flowchart of an example operation of the machine learning module 510, under one embodiment. The recommendation engine 225 receives 1105 a request to provide content item recommendations (e.g., for TV and Movie programming). The recommendation engine 225 obtains 1110 (e.g., from the content store 230 and user profile store 205) explicit user preference feedback from the set of users serviced by the recommendation engine 225 (e.g., through the user's explicit rating of multimedia programs, etc.) and implicit user preference feedback from the set of users (e.g., through the viewing histories of the users, etc.). The recommendation engine 225 then determines 1115 recommendation preference scores, or ratings, for a set of programs/content items for a selected user. In one embodiment, the recommendation engine 225 determine 1115 the recommendations through one or more collaborative filtering techniques disclosed herein. The recommendation engine 225 then provides 1120 recommendations of the content items to the selected user's device based on the recommendation ratings of the set of available viewing options that were determined for the selected user.

Under an embodiment, the machine learning module 510 of the recommendation engine 225 generates recommendation or preference scores using collaborative filtering models to generate recommendation or preference scores. For ease of reference during the following discussion of collaborative filtering models, Table 1 (set forth below) illustrates the various symbols used in the equations and expressions described herein and their corresponding meanings or representations.

TABLE 1

| Symbol: | Representation: |
|---|---|
| u, v | user |
| i, j | item |
| $r_{ui}$ | rating indicating the preference of user u for item i |
| $\hat{r}_{ui}$ | predicted rating for the preference of user u for item i |
| $e_{ui}$ | prediction error for preference of user u for item i |
| κ | set of (u, i) pairs for which the rating $r_{ui}$ is known (k = {(u, i)|$r_{ui}$ known}) |
| R(u) | the set of items rated by user u |
| N(u) | the set of all items for which user u provided some implicit preference |
| $\lambda_1, \lambda_2, \ldots$ | regularization constants (determined via, e.g., cross-validation) |
| $\gamma_1, \gamma_2, \ldots$ | learning rate (step size) |
| μ | average rating for all items of a set of items |
| $b_u$ | observed deviation of the user u from the average |
| $b_i$ | observed deviation of the item i from the average |
| $b_{ui}$ | baseline estimate for an unknown rating $r_{ui}$ |
| $s_{ij}$ | measure of similarity between items i and j |
| $\rho_{ij}$ | Pearson correlation coefficient (measuring tendency of users to rate items i and j similarity) |
| $n_{ij}$ | the number of users who have rated both item i and item j |

TABLE 1-continued

Symbol Notation

| Symbol: | Representation: |
|---|---|
| $S^k(i)$ | the k items that are most similar to item i |
| $S^k(i; u)$ | the k items, rated by user u, that are most similar to item i |
| $R^k(i; u)$ | the set of items that are among the k most similar to item i and have been rated by user u, i.e., $R^k(i; u) \equiv R(u) \cap S^k(i)$ |
| $N^k(i; u)$ | the set of items that are among the k most similar to item i and have some implicit preference indicated by user u, i.e., $N^k(i; u) \equiv N(u) \cap S^k(i)$ |
| $\Box^f$ | the set of real vectors having f components |
| $p_{ij}$ | the user-factors vector for the user u determined from a user-items rating matrix via Singular Value Decomposition (SVD) ($p_{ij} \in \Box^f$) |
| $q_i$ | the item-factors vector for the item i determined from a user-items rating matrix via SVD ($q_i \in \Box^f$) |
| $x_i, y_i$ | factor vectors for item i determined from a user-items rating matrix via SVD |
| $\theta_{ij}^u$ | user-specific interpolation weight for items i and j for user u |
| $\omega_{ij}$ | user-independent interpolation weight for items i an j |
| $c_{ij}$ | implicit-preference interpolation weight for items i and j |

As noted by Table 1, special indexing letters are reserved for distinguishing users from items: the index letters u and v for users; and the index letters for items i and j. A rating $r_{ui}$ indicates the preference of user u for item i, where higher values represent stronger preferences and vice versa. For example, ratings can be integers ranging from 1 (star) indicating no interest to 5 (stars) indicating a strong interest. Predicted ratings are distinguished from known ones using the notation $\hat{r}_{ui}$ for the predicted value of $r_{ui}$. The (u, i) pairs for which $r_{ui}$ is known are stored in the set $K = \{(u, i) | r_{ui} \text{ known}\}$. Usually the vast majority of ratings are unknown. For example, in the Netflix data, 99% of the possible ratings are absent. In order to combat overfitting such sparse rating data, the models disclosed herein can be regularized so that estimates are shrunk towards baseline defaults. Regularization is controlled by regularization constants which are denoted as $\lambda_1, \lambda_2, \ldots$. Exact values of these regularization constants can be determined by cross validation such that, as they increase in value regularization becomes heavier.

Typical content store 230 and profile store 205 datasets (containing explicit/implicit user feedback and preference data) exhibit large user and item effects, i.e., systematic tendencies for some users to give higher ratings than others, and for some items to receive higher ratings than others. It is customary to adjust the data by accounting for these effects, which are encapsulated within baseline estimates. EQ. 1 below represents a model for determining a baseline estimate, denoted as $b_{ui}$, for an unknown rating $r_{ui}$ for a selected user u and a selected item i, whereby the model accounts for the user and item effects:

$$b_{ui} = \mu + b_u + b_i \quad \text{EQ.1}$$

whereby $\mu$ represents the overall average rating for the item i and the parameters $b_u$ and $b_i$ indicate the observed deviations of user u and item i, respectively, from the average. For example, suppose that a baseline estimate is desired for the rating of Movie A by User B. Assuming that the average rating over all movies, $\mu$, is 3.7 stars and Movie A is better than an average movie, so it tends to be rated 0.5 stars above the average. On the other hand, User B is a critical user, who tends to rate movies 0.3 stars lower than the average. Thus, the baseline estimate for User B's rating of Movie A using EQ. 1 would be 3.9 stars (3.7−0.3+0.5).

The least squares problem of EQ. 2 below can be used to estimate $b_u$ and $b_i$:

$$\min_{b*} \sum_{(u,i) \in K} (r_{ui} - \mu - b_u - b_i)^2 + \lambda_1 * \left( \sum_u b_u^2 + \sum_i b_i^2 \right) \quad \text{EQ. 2}$$

In EQ. 2, the first term $$\sum_{(u,i) \in K} (r_{ui} - \mu - b_u - b_i)^2$$

strives to find values for $b_u$ and $b_i$ that fit the given ratings. The regularizing term $$\lambda_1 * \left( \sum_u b_u^2 + \sum_i b_i^2 \right)$$

has the effect of reducing or avoiding overfitting by penalizing the magnitudes of the parameters.

As discussed above, the collaborative filtering may use neighborhood models. Early neighborhood models were user-oriented and estimated unknown ratings based on recorded ratings of like minded users. Subsequently, an item-oriented neighborhood approaches were instituted. In these models, a rating is estimated using known ratings made by the same user on similar items. Better scalability and improved accuracy make the item-oriented approach more favorable in many cases. In addition, item-oriented neighborhood methods are more amenable to explaining the reasoning behind predictions. This is because users are familiar with items previously preferred by them, but do not know those allegedly like-minded users. Thus, the neighborhood models described below are described in the context of item-oriented approaches. However, these techniques can be adapted for a user-oriented approach by switching the roles of users and items without departing from the scope of the present disclosure.

Central to most item-oriented neighborhood models is a similarity measure between items. Frequently, it is based on the Pearson correlation coefficient, $\rho_{ij}$ which measures the tendency of users to rate items i and j similarly. Because many ratings typically are unknown, it is expected that some items share only relatively few common raters. Computation of the correlation coefficient therefore is based only on the common user support. Accordingly, similarities based on a greater user support are more reliable. An appropriate similarity measure, denoted by $s_{ij}$, includes a shrunk correlation coefficient:

$$s_{ij} = \frac{n_{ij}}{n_{ij} + \lambda_2} \rho_{ij} \quad \text{EQ. 3}$$

The variable $n_{ij}$ denotes the number of users that rated both items i and j. A typical value for $\lambda_2$ is 100, but it depends on the dataset and is determined by cross-validation. Although EQ. 3 illustrates an example similarity measure, alternate similarity measures can be implemented in place of the illustrated similarity measure.

The goal of a recommendation system 225 is to predict $r_{ui}$, i.e., the unobserved rating by a selected user u for a selected item i, and selectively recommend the item according to the predicted rating. To this end, the k items rated by user u which are most similar to item i are identified by the recommender system using the similarity measure $s_{ij}$. This set of k neighbors is denoted by $S^k$ (i; u). As illustrated by EQ. 4, the predicted value of $r_{ui}$ can taken as a weighted average of the ratings of neighboring items while adjusting for user and item effects through the baseline estimates:

$$\hat{r}_{ui} = b_{ui} + \frac{\sum_{j \in S^k(i;u)} s_{ij}(r_{uj} - b_{uj})}{\sum_{j \in S^k(i;u)} s_{ij}} \quad \text{EQ. 4}$$

Conventional neighborhood models of this form are frequently used because they are intuitive and relatively simple to implement. However, such neighborhood schemes are subject to certain limitations. Most notably, these conventional techniques are not justified by a formal model. Further, the suitability of a similarity measure that isolates the relations between two items without analyzing the interactions within the full set of neighbors can be suspect. In addition, the fact that interpolation weights in EQ. 4 sum to one (1) forces this method to fully rely on the neighbors, even in cases where neighborhood information is absent (i.e., user u did not rate items similar to i), and it would be preferable to rely on baseline estimates.

Accordingly, a more accurate conventional neighborhood model was developed in view of the above-identified limitations in conventional neighborhood models. In this model, the recommender system determines interpolation weights $\{\theta_{ij}^u | S^k(i; u)\}$ for set of neighbors $S^k(i; u)$ that enable the best prediction rule of EQ. 5:

$$\hat{r}_{ui} = b_{ui} + \sum_{j \in S^k(i;u)} \theta_{ij}^u (r_{uj} - b_{uj}) \quad \text{EQ. 5}$$

Derivation of the interpolation weights $\theta_{ij}^u$ can be achieved by estimating all inner products between item ratings.

As discussed above, latent factor models comprise an alternative approach to collaborative filtering with the more holistic goal to uncover latent features that explain observed ratings; examples include Probabilistic Latent Semantic Analysis (pLSA), neural networks, and Latent Dirichlet Allocation. More recently, models that employ Singular Value Decomposition (SVD) on the user-item ratings matrix gained popularity due to their accuracy and scalability. A typical conventional SVD-based model associates each user u with a user-factors vector $p_u \in \Box^f$, and each item i with an item-factors vector $q_i \in \Box^f$. A prediction for the preference of a selected user u for a selected item i can be calculated by taking an inner product as represented by EQ. 6:

$$\hat{r}_{ui} = b_{ui} + p_u^T q_i \quad \text{EQ 6}$$

However, the more calculation-intensive part is parameter estimation. In information retrieval, SVD often is used to identify latent semantic factors. However, applying SVD in the CF domain raises difficulties due to the high portion of missing ratings. Conventional SVD is undefined when knowledge about the matrix is incomplete. Moreover, addressing only the relatively few known entries without the appropriate caution is highly prone to overfitting. Some conventional processes rely on imputation to fill in missing ratings and make the rating matrix dense. However, this imputation can be very calculation-intense as it significantly increases the amount of data. In addition, the data may be considerably distorted due to inaccurate imputation. Accordingly, other conventional processes have been developed that model directly only the observed ratings, while avoiding overfitting through an adequate regularized model, such as EQ.7:

$$\min_{p_*, q_*, b_*} \sum_{(u,i) \in \kappa} (r_{ui} - \mu - b_u - b_i - p_u^T q_i) + \lambda_3(\|p_u\|^2 + \|q_i\|^2 + b_u^2 + b_i^2) \quad \text{EQ. 7}$$

A simple gradient descent technique can be applied to solve EQ.7.

As described above, a machine learning module 510 may implement under an embodiment collaborative filtering techniques to predict user preferences for content or media items available for viewing. In at least one embodiment, the recommendation engine 225 uses a threshold weight to determine whether to recommend a particular Television or movie programming event based on a preference score generated by the machine learning module 510. To illustrate, if the recommendation ratings for the set of viewing options have a possible range of 0.0 (least recommended) to 1.0 (most recommended), then a threshold weight of, for example, 0.7 could be used to determine whether to recommend content. In another embodiment, the recommendation engine 225 is configured to recommend the top N programming options by recommendation rating. To illustrate, the recommendation component could select the ten (N=10) multimedia programs with the highest recommendation ratings of the set of multimedia programs considered for recommendation. Under an embodiment, the recommendation engine 225 may rank programming options in each category of sport, television and movie and use an allocation approach to present viewing options across all categories.

As set forth above, the recommendation engine 225 includes an allocation module 515. The allocation module 515 monitors a user's viewing behavior and tracks the number of viewing selections in the categories of sport, television and movie. If a user watches more sporting related content items than movies and television programming then the allocation module 515 assigns a stronger weight to sporting related content item category. As but one example, a user may watch eight sporting related content items, one television program content item and one movie content item. The allocation module 515 knows that a user (based on viewing history) selects sport programming 80% of the time, movie programming 10% of the time and television programming 10% of the time. This information is useful when the recommendation engine 225 selects recommended content items for a user. For example, a user may activate the client application and select top picks to see top pick recommendations across sport, television and movie categories. The recommendation engine 225 (using a combination of the bookkeeping tables, rules and machine learning predictions) then produces preference scores for sport, television and viewing options and ranks content items in each such category using the preferences scores. The recommendation engine 225 then uses information from the allocation module 515 to allocate 80% of a total set of recommended viewing options to sporting contents, and thereafter 10% to television and 10% to movies.

Under an embodiment, the machine learning module 510 of the recommendation engine 225 monitors its performance through the use of evaluation metrics. Metrics serve a dual purpose. First, metrics are used to evaluate the performance of an algorithm itself and to compare the performance of one algorithm against another. Also, metrics may also be used to measure a system's overall quality using a simple score. In the context of a recommendation engine 225, a system metric under one embodiment compares predicted versus real user preference scores. The Netflix competition provides an example of a performance metric used to determine the effectiveness of recommendation algorithms.

In October 2006, Netflix, Inc. initiated a contest, the Netflix Prize, with the goal to improve upon the current movie recommender system, Cinematch, implemented by Netflix. To this end, Netflix released a test dataset of over 1.4 million recent movie ratings (the "test set") and a validation dataset of over 1.4 million ratings (the "probe set"), which is used to validate the performance of a recommender system on the test set. These two datasets are collectively referred to herein as "the Netflix data". Netflix's Cinematch algorithm achieved a RMSE prediction error of 0.9514 on the test set, and Netflix has declared the grand prize winner will be the first contestant to develop a process that provides a 10% improvement, or an RMSE of 0.8563, over their Cinematch algorithm on the test set. The two sets of the Netflix data contain many more ratings by users that do not rate much and are harder to predict. Thus, they accurately represent the typical datasets available to a recommendation engine 225, which is implemented to predict new ratings from older ones, and to equally address all users, not only the users who rate most frequently.

Under an embodiment, the recommendation engine 225 is evaluated against the Netflix dataset itself in order to determine the quality of television and movie recommendations using the RMSE metric. Accordingly, the RMSE (or alternative) metric (as evaluated against the Netflix test data) may be used (i) to compare and evaluate the performance and accuracy of different machine learning algorithms an (ii) to adjust and tune parameters of an individual algorithm. Under an alternative embodiment, the recommendation engine 225 may collect explicit user feedback on programming and create a dataset of know responses. The algorithms of the machine learning module 510 may then be evaluated by comparing predicted versus real content scores using an RMSE or alternative metric.

A bookkeeping module 505 and a rules module 525 generate preference scores and corresponding recommendations for sporting related content item content. The rules module 525 adjusts bookkeeping preference scores to account for known viewing behaviors that are not easily captured by empirical tracking and analysis of viewing events and occurrences. Under an embodiment, a machine learning module 510 generates preference scores and corresponding recommendations for Television and Movie programming. As already described above, a rules module 525 may also be used to weight or adjust machine learning preference scores.

Under yet another embodiment, a time adjustment module 520 further weights all such preference scores by evaluating a media event's proximity to real time availability. The timing component accounts for the appeal of immediately available content and provides a score boost for currently available time slot. The recommendation engine 225 uses the time adjustment module 520 to increase ratings or preference scores for programming available for immediate viewing. Under an embodiment, programming available for viewing within several hours of current time receive a lower ratings boost. Programming available outside this 1-2 hour window but within a larger twenty four hours programming period may receive an even lower ratings boost while programming beyond the twenty four hour threshold may receive no ratings boost at all. Alternative embodiments may assign time adjusted weighting using any combination of programming windows of varying lengths and associated with varying weights.

Under an embodiment, the recommendation engine 225 uses the time adjustment module 520 to apply time adjustments in real time for a given time period of interest to a user. For example, a user may select a movie category using the user device thereby requesting recommendations for movie programming at a given time. Under an embodiment of the user device interface, a user may scroll across thirty minute time slots to view movies available at later time segments. The time adjustment module 520 adjusts preference scores upward for content immediately available for viewing and conversely downwardly adjusts preference scores for content not available until a later time segment. If a user device 105 is configured to present content in discrete time thirty minute time bins, a time adjustment module 520 may therefore weed out all but the highest rated content for viewing segments in the future. As one example, a user may request a recommendation for movies in a current 8:00-8:30 PM CST time slot. The user device will populate such time slot with movie recommendations. As the user scroll forward to see recommendations in later time slots, a time adjustment formula downgrades content items based on its distance from real time availability. Under an embodiment, the user device 105 only presents movies that achieve threshold preference values. As the user scrolls to time segments further and further from the current real time of user device use, only the movies with very high ratings will maintain preference scores over a threshold value in the face of downward adjustments applied by the time adjustment formula. Under another embodiment, the recommendation engine 225 and user device are configured to provide recommendations across a large time block, e.g., movies available over the next twenty four hour period. Under this embodiment, the recommendation engine 225 is configured to present the top (e.g., twenty) pieces of content over such time period. The time adjustment module 520 downgrades movies available later in the time interval versus movies immediately available for viewing. Under yet another embodiment, the recommendation engine 225 provides recommended content for movies available via streaming over an Internet connection, e.g. Netflix. Under this embodiment, a user device may recommend Netflix content anytime, i.e. the Netflix content is available in any particular time segment as long as the content's preference score is high enough to meet a visibility threshold imposed by the recommendation engine 225. As a user scrolls to time segments in the future, the time adjustment module 520 continues to adjust a preference score for Netflix content upward due to its immediate availability. Therefore, the user device features a greater selection of Netflix (or otherwise immediately available streaming) content in time slots that are distant from the current real time of the user.

It should be noted that if a user's television is off, the user device does not know if or when a user will decide to activate and view the television. Under one embodiment, the recommendation engine 225 is configured to provide recommendations to a user within a large block of time. For example, a recommendation engine 225 may be configured to provide recommendations to a user for content available within the next two weeks. As this block of time grows longer, the recommendation engine 225 effectively provides preference scores and corresponding recommended content for all available programming irrespective of time.

The timing adjustment component includes temporal or timing models to track time-varying popularity of TV and movie items and time-varying tastes of individuals. Timing models are useful to detect both long term changes in user behavior and short term burst changes including changes over a month or day to day. Therefore timing models may capture gradual preference changes, e.g. slow change of a child's television viewing preferences over time, and short term preference shifts, e.g. viewing behavior changes on certain days such as Halloween. Timing models may also identify long term and short term popularity of items. For example, certain movies may prove to sustain long term popularity. However, other movies may develop short term interest or popularity for short periods of time, e.g. during Christmas or after an Oscar nomination. Note that for timing models to be effective, data must be collected for several years. Therefore, a recommendation engine 225 under one embodiment maintains data for timing models from start-up of operation and incorporates timing models once sufficient data is collected. Under one embodiment, a timing adjustment component of the recommendation engine 225 analyzes the timing model dataset to develop adjustment weights that may then be applied to preference scores generated by the machine learning module 510.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, mainframe computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The media system 140 (including a recommendation engine 225) can be a component of a single system, multiple systems, and/or geographically separate systems. The media system 140 can also be a subcomponent or subsystem of a single system, multiple systems, and/or geographically separate systems. The media system 140 can be coupled to one or more other components (not shown) of a host system or a system coupled to the host system.

One or more components of the media system 140 and the media control environment 100 and/or a corresponding system or application to which the media system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the media system 140 can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the media system 140 and corresponding systems and methods described in the media control environment 100 herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the media control system and corresponding systems and methods include: microcontrollers with memory (such as electronically erasable programmable read only memory (EEPROM)), embedded microprocessors, firmware, software, etc. Furthermore, aspects of the media control system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the media control environment 100 and corresponding systems and methods is not intended to be exhaustive or to limit the systems and methods to the precise forms disclosed. While specific embodiments of, and examples for, the media system 140, recommendation engine 225, user device 105, user application 110 and corresponding systems and methods are described herein for illustrative purposes, various equivalent modifications are possible within the scope of the systems and methods, as those skilled in the relevant art will recognize. The teachings of the media control environment 100 and corresponding systems and methods provided herein can be applied to other systems and methods, not only for the systems and methods described above.

In general, in the following claims, the terms used should not be construed to limit the media control environment 100 and corresponding systems and methods to the specific embodiments disclosed in the specification and the claims, but should be construed to include all systems that operate under the claims. Accordingly, the media control environment 100 and corresponding systems and methods is not limited by the disclosure, but instead the scope is to be determined entirely by the claims.

While certain aspects of the media control environment 100 and corresponding systems and methods are presented below in certain claim forms, the inventors contemplate the various aspects of the media control system and corresponding systems and methods in any number of claim forms. Accordingly, the inventors reserve the right to add additional claims after filing the application to pursue such additional claim forms for other aspects of the media control system and corresponding systems and methods.

What is claimed is:

1. A method of recommending content items to a target user, the method comprising:
    receiving information about interactions of the target user with a set of content items through a device;
    resolving the set of content items with which the target user interacted with into associated attributes;
    updating a table associated with the target user with the associated attributes, the updating further comprising increasing, for each attribute, a count based on occurrences of the attribute in the set of content items;
    determining, for the target user, a preference weight for each attribute in the table based on the count of the attribute and time passed since each increase in the count of the attribute;
    receiving a request associated with the target user for a content item recommendation;
    resolving each available content item in a set of available content items for consumption of the target user into associated attributes;
    determining, for the target user, a score for each available content item in the set of available content items based on the preference weight of the target user for each of the attributes associated with the available content item;
    determining a set of recommended content items from the set of available content items for the target user based on a ranking of the scores;
    providing the set of recommended content items to the device;
    receiving indication of a user selection of a recommended content item by the target user in the set of the recommended content items; and
    providing instructions to the user device for facilitating the presentation of the content item with an entertainment system of the target user.

2. The method of claim 1, wherein the device comprises a portable computing device.

3. The method of claim 1, further comprising adjusting a score of a given available content item in the set of available content items based on a magnitude of average explicit feedback ratings provided by the target user for one or more of the content items in the set of content items with which the target user interacted.

4. The method of claim 1, further comprising adjusting a score of a given available content item in the set of available content items based on ratings by other users for the given available content item.

5. The method of claim 1, further comprising adjusting a score of a given available content item in the set of available content items based on a ratio of user viewership of one or more of the attributes associated with the given available content item to one or more attributes associated with the other available content items.

6. The method of claim 1, further comprising adjusting a score of a given available content item in the set of available content items based on a temporal availability of the given available content item.

7. The method of claim 6, wherein a temporal availability of the given available content item identifies a time delay for the target user to consumer the given available content item.

8. The method of claim 1, further comprising adjusting a score of a given available content item in the set of available content items based on a temporal preference of one or more of the attributes associated with the given available content item.

9. The method of claim 8, wherein a temporal preference of an attribute identifies a historical time period associated with increase of counts for the attribute.

10. A computer readable storage medium comprising stored instructions executable by one or more processors, the instructions when executed by the one or more processors causing the one or more processors to:
    receive information about interactions of the target user with a set of content items through a device;
    resolve the set of content items with which the target user interacted with into associated attributes;
    update a table associated with the target user with the associated attributes, the updating further comprising increasing, for each attribute, a count based on occurrences of the attribute in the set of content items;
    determine, for the target user, a preference weight for each attribute in the table based on the count of the attribute and time passed since each increase in the count of the attribute;
    receive a request associated with the target user for a content item recommendation;
    resolve each available content item in a set of available content items for consumption of the target user into associated attributes;
    determine, for the target user, a score for each available content item in the set of available content items based on the preference weight of the target user for each of the attributes associated with the available content item;
    determine a set of recommended content items from the set of available content items for the target user based on a ranking of the scores;
    provide the set of recommended content items to the device;
    receive indication of a user selection of a recommended content item in the set of the recommended content items; and
    provide information to the user device to facilitate the presentation of the content item with an entertainment system of the user.

11. The computer readable storage medium of claim 10, further comprising adjusting a score of a given available content item in the set of available content items based on a magnitude of average explicit feedback ratings provided by the target user for one or more of the content items in the set of content items with which the target user interacted.

12. The computer readable storage medium of claim 10, further comprising adjusting a score of a given available content item in the set of available content items based on ratings by other users for the given available content item.

13. The computer readable storage medium of claim 10, further comprising adjusting a score of a given available content item in the set of available content items based on a ratio of user viewership of one or more of the attributes associated with the given available content item to one or more attributes associated with the other available content items.

14. The computer readable storage medium of claim 10, further comprising adjusting a score of a given available content item in the set of available content items based on a temporal availability of the given available content item.

15. The computer readable storage medium of claim 14, wherein a temporal availability of the given available content item identifies a time delay for the target user to consumer the given available content item.

16. The computer readable storage medium of claim 10, further comprising adjusting a score of a given available content item in the set of available content items based on a temporal preference of one or more of the attributes associated with the given available content item.

17. The computer readable storage medium of claim 16, wherein a temporal preference of an attribute identifies a historical time period associated with increase of counts for the attribute.

18. A method of recommending content items to a target user, the method comprising:
 receiving a request for a content item recommendation from a device of the target user, the target user having one or more premise entertainment systems operable though the device;
 determining a set of recommended content items for the target user based on explicit feedback and implicit feedback received from interactions of the target user with a set of content items through the device, the set of recommended content items selected from a plurality of ranked available content items rated for the target user, a rating for a given available content item recommended to the target user determined by:
  resolving the set of content items with which the target user interacted with into associated attributes,
  updating a table associated with the target user with the associated attributes, the updating further comprising
   increasing, for each attribute, a count based on occurrences of the attribute in the set of content items,
   determining, for the target user, a preference weight for each attribute in the table based on the count of the attribute and time passed since each increase in the count of the attribute,
  resolving the given available content item into associated attributes,
  determining, for the target user, a score for the given available content item based on the preference weight of the target user for each of the attributes associated with the given available content item, and
  adjusting the rating for the given content item based on one or more of:
   a magnitude of average explicit feedback ratings provided by the target user for one or more of the content items in the set of content items,
   ratings by other users for the given available content item,
   a ratio of user viewership of one or more of the attributes associated with the given available content item to one or more attributes associated with other available content items,
   temporal availability of the given available content item, and
   temporal preference of one or more of the attributes associated with the given available content item;
 transmitting the set of recommended content items to the device;
 receiving indication of a user selection by the target user of a recommended content item in the set of the recommended content items; and
 providing a set of instructions to the user device for facilitating the presentation of the recommended content item with a set of entertainment systems associated with presenting the recommended content item identified from the one or more premise entertainment systems of the user, instructions comprising:
  instructions associated with the set of entertainment systems, the instructions translated by the user device into commands causing each of the entertainment systems in the set to perform a function associated with presenting the recommended content item, and
  wherein the set of instructions cause the set of entertainment systems to present the content item.

19. The method of claim 18, wherein a temporal availability of the given available content item identifies a time delay for the target user to consumer the given available content item.

20. The method of claim 18, wherein a temporal preference of an attribute identifies a historical time period associated with increase of counts for the attribute.

* * * * *